United States Patent
Ehara et al.

(10) Patent No.: US 9,845,395 B2
(45) Date of Patent: Dec. 19, 2017

(54) ANTIFOULING COATING COMPOSITION, ANTIFOULING FILM, COMPOSITE FILM, AND IN-WATER STRUCTURE

(75) Inventors: Ryo Ehara, Neyagawa (JP); Haruyasu Minami, Neyagawa (JP); Soichiro Tomiyama, Neyagawa (JP)

(73) Assignee: Nippon Paint Marine Coatings Co., Ltd., Hyogo (JP)

( * ) Notice: Subject to any disclaimer, the term of this patent is extended or adjusted under 35 U.S.C. 154(b) by 268 days.

(21) Appl. No.: 13/501,424

(22) PCT Filed: Oct. 8, 2010

(86) PCT No.: PCT/JP2010/067763
§ 371 (c)(1),
(2), (4) Date: Apr. 11, 2012

(87) PCT Pub. No.: WO2011/046086
PCT Pub. Date: Apr. 21, 2011

(65) Prior Publication Data
US 2012/0202080 A1    Aug. 9, 2012

(30) Foreign Application Priority Data

Oct. 13, 2009  (JP) ................................. 2009-236035

(51) Int. Cl.
| | | |
|---|---|---|
| C09D 5/00 | (2006.01) | |
| C09D 5/16 | (2006.01) | |
| C09D 143/04 | (2006.01) | |
| C09D 193/04 | (2006.01) | |

(52) U.S. Cl.
CPC ........... *C09D 5/165* (2013.01); *C09D 5/1618* (2013.01); *C09D 143/04* (2013.01); *C09D 193/04* (2013.01); *Y10T 428/31663* (2015.04)

(58) Field of Classification Search
None
See application file for complete search history.

(56) References Cited

U.S. PATENT DOCUMENTS

| | | | |
|---|---|---|---|
| 5,080,892 A | | 1/1992 | Yamamori et al. |
| 6,123,755 A | | 9/2000 | Yamamori et al. |
| 2002/0011177 A1 | | 1/2002 | Yamamori et al. |
| 2003/0139558 A1 | | 7/2003 | Yamamori et al. |
| 2006/0258772 A1 | * | 11/2006 | Sugihara et al. .............. 523/122 |
| 2009/0053166 A1 | * | 2/2009 | Niimoto .................... 424/78.09 |
| 2009/0325098 A1 | * | 12/2009 | Veregin ................ G03G 9/0804 430/108.3 |
| 2010/0209381 A1 | | 8/2010 | Tanaka |

FOREIGN PATENT DOCUMENTS

| | | | |
|---|---|---|---|
| CN | 101029207 A | * | 9/2007 |
| JP | 62-057464 | | 3/1987 |
| JP | 09-208860 A | | 8/1997 |
| JP | 09286933 A | * | 11/1997 |
| JP | 10-168351 A | | 6/1998 |
| JP | 10-298455 | | 11/1998 |
| JP | 2001-072869 A | | 3/2001 |
| JP | 2001-342421 A | | 12/2001 |
| JP | 2001-342432 | | 12/2001 |
| JP | 2002-241676 A | | 8/2002 |
| JP | 2003-119420 | | 4/2003 |
| JP | 2003-252931 | | 9/2003 |
| JP | 2004-002819 | | 1/2004 |
| JP | 2004-300410 | | 10/2004 |
| JP | 2004-307816 | | 11/2004 |
| JP | 2006-077095 A | | 3/2006 |
| JP | 2009-091562 A | | 4/2009 |
| JP | 2009-108257 A | | 5/2009 |
| WO | WO 2004/081121 A1 | | 9/2004 |
| WO | WO 2007/026692 A1 | | 3/2007 |
| WO | WO 2009/011332 A1 | | 1/2009 |
| WO | WO 2009011332 A1 | * | 1/2009 ............... C09D 5/16 |

OTHER PUBLICATIONS

WO 2009011332 English machine translation from WIPO.*
English machine translation of JP2004-300410 (2004).*
English translation of JP 2006 77095 (2006).*
JNC America Silaplane datasheet 2 pgs (2012).*
English machine translation of JP 09286933 (1997).*
English machine translation CN101029207 (2007).*
European Patent Office extended search report on application 10823354.5 dated Apr. 23, 2013; 8 pages.
International Search Report in related International Patent Application No. PCT/JP2010/067763, dated Oct. 27, 2010.
Japan Patent Office; notice of Grounds of Rejection dated Oct. 7, 2014 on application 2011-536122; pp. 1-3.
Japan Patent Office Notice of Grounds of Rejection on application 2011-536123 dated Jun. 18, 2013; pp. 1-4.
Office Action dated Oct. 24, 2017, in JP 2011-536122, Appeal No. 2015-18180, with English translation.

* cited by examiner

*Primary Examiner* — Kenneth Stachel
(74) *Attorney, Agent, or Firm* — Foley & Lardner LLP

(57) ABSTRACT

Provided are an antifouling coating composition that contains: a hydrolyzable resin having a specific silicon-containing group and a metal-atom-containing group containing a divalent metal atom M; and a thermoplastic resin and/or a plasticizer, wherein the total content of the thermoplastic resin and/or plasticizer per 100 parts by mass of the hydrolyzable resin is 3 to 100 parts by mass, an antifouling film, a composite film and an in-water structure such as a ship using the antifouling coating composition. The antifouling coating composition makes it possible to form a coating film that is excellent in crack resistance and exhibits a good antifouling property over a long period of time even when no antifouling agent is contained or the blending amount thereof is small.

7 Claims, No Drawings

ANTIFOULING COATING COMPOSITION, ANTIFOULING FILM, COMPOSITE FILM, AND IN-WATER STRUCTURE

TECHNICAL FIELD

The present invention relates to an antifouling coating composition, and more specifically, to an antifouling coating composition containing a hydrolyzable resin that gradually dissolves in water by hydrolysis. Also, the present invention relates to an antifouling film formed from the antifouling coating composition and a composite film having the antifouling film, and an in-water structure such as a ship having the antifouling film or the composite film.

BACKGROUND ART

Organisms such as barnacles, mussels and algae are likely to adhere on ships, fish nets, and other in-water structures. Such adhesion of organisms will lead the problem of hindrance of efficient travel and waste of the fuel in ships and the like. In fish nets and the like, the problems of clogging and shortening of the service life arise. Conventionally, for preventing adhesion of organisms to these in-water structures, a measure of applying an antifouling paint on surfaces of an in-water structure has been taken.

As the above antifouling paint, an antifouling paint containing a hydrolyzable resin having a hydrolyzable group such as a metal-atom-containing group in a resin side chain as a binder resin (vehicle) is recently used because in such an antifouling paint, the antifouling film surface is gradually self-polished by hydrolysis by being dipped in water, and as a result, an antifouling effect can be exerted for a long period of time [for example, Patent Literature 1 (Japanese Patent Laying-Open No. 62-57464), Patent Literature 2 (Japanese Patent Laying-Open No. 10-298455) and Patent Literature 3 (Japanese Patent Laying-Open No. 2001-342432)]. However, in the conventional antifouling paint, it is necessary to separately blend a large amount of antifouling agent for exerting an antifouling effect for a long period of time.

In order to solve these problems, for example, in Patent Literature 4 (Japanese Patent Laying-Open No. 2004-300410) and Patent Literature 5 (Japanese Patent Laying-Open No. 2004-307816) there are proposed antifouling coating compositions containing, as a vehicle, a copolymer containing a polymerizable monomer unit containing (meth)acryl-modified silicon at one terminal and/or both terminals and a metal-atom-containing polymerizable monomer unit containing a divalent metal atom. However, coating films formed from the antifouling coating compositions described in Patent Literature 4 and Patent Literature 5 are insufficient in crack resistance, and the coating films can be cracked by being dipped in water (sea water or the like) for a long period of time, or under an environment where drying and wetting are repeated, although they exhibit an excellent antifouling property.

CITATION LIST

Patent Literature

PTL 1: Japanese Patent Laying-Open No. 62-57464
PTL 2: Japanese Patent Laying-Open No. 10-298455
PTL 3: Japanese Patent Laying-Open No. 2001-342432
PTL 4: Japanese Patent Laying-Open No. 2004-300410
PTL 5: Japanese Patent Laying-Open No. 2004-307816

SUMMARY OF INVENTION

Technical Problem

It is an object of the present invention to provide an antifouling coating composition capable of forming a coating film that exhibits an excellent antifouling property over a long period of time and is excellent in crack resistance even when no antifouling agent is contained or the blending amount thereof is small. Another object of the present invention is to provide an antifouling film formed from the antifouling coating composition, a composite film having the antifouling film, and an in-water structure such as a ship having the antifouling film or the composite film.

Solution to Problem

According to the present invention, there is provided an antifouling coating composition containing a hydrolyzable resin having at least one kind of silicon-containing group selected from the group consisting of the groups represented by the following general formulas (I), (II), (III) and (IV) and a metal-atom-containing group containing a divalent metal atom M, and a thermoplastic resin and/or a plasticizer, wherein the total content of the thermoplastic resin and/or plasticizer is 3 to 100 parts by mass per 100 parts by mass of the hydrolyzable resin.

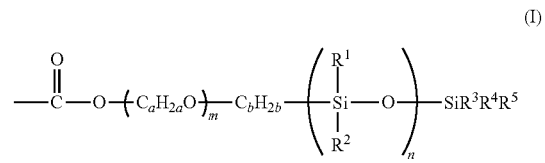

(I)

Here, in the general formula (I), a and b each independently represent an integer of 2 to 5, m represents an integer of 0 to 50, and n represents an integer of 3 to 80. $R^1$ to $R^5$ each independently represent an alkyl group, an alkoxy group, a phenyl group, a substituted phenyl group, a phenoxy group or a substituted phenoxy group.

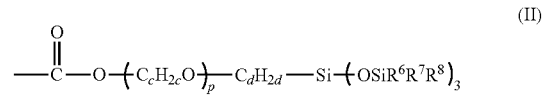

(II)

Here, in the general formula (II), c and d each independently represent an integer of 2 to 5, and p represents an integer of 0 to 50, $R^6$, $R^7$ and $R^8$ each independently represent an alkyl group, $R^a$ or $R^b$.

$R^a$ is

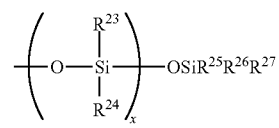

(wherein x represents an integer of 0 to 20; and $R^{23}$ to $R^{27}$ are the same or different and each represent an alkyl group), and $R^b$ is

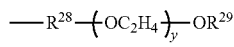

(wherein y represents an integer of 1 to 20; and $R^{28}$ and $R^{29}$ are the same or different and each represent an alkyl group).

(III)

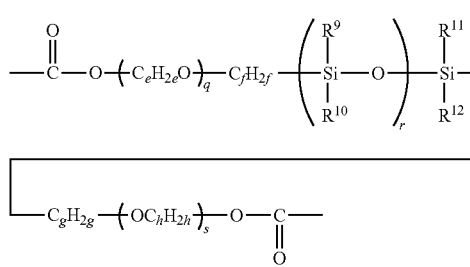

Here, in the general formula (III), e, f, g and h each independently represent an integer of 2 to 5, q and s each independently represent an integer of 0 to 50, and r represents an integer of 3 to 80. $R^9$ to $R^{12}$ each independently represent an alkyl group, an alkoxy group, a phenyl group, a substituted phenyl group, a phenoxy group or a substituted phenoxy group.

(IV)

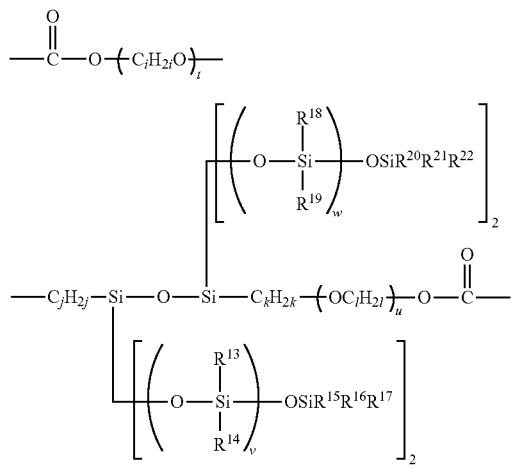

Here, in the general formula (IV), i, j, k and l each independently represent an integer of 2 to 5, t and u each independently represent an integer of 0 to 50, and v and w each independently represent an integer of 0 to 20. $R^{13}$ to $R^{22}$ are the same or different and each represent an alkyl group.

The metal-atom-containing group of the hydrolyzable resin is preferably at least one kind of group selected from the group consisting of the groups represented by the following general formulas (V) and (VI).

(V)

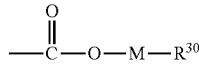

Here, in the general formula (V), M represents a divalent metal atom, and $R^{30}$ represents an organic acid residue or an alcohol residue.

(VI)

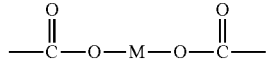

Here, in the general formula (VI), M represents a divalent metal atom.

In the antifouling coating composition of the present invention, the hydrolyzable resin is preferably a resin containing a constituent unit derived from at least one kind of silicon-containing polymerizable monomer (a) selected from the group consisting of a monomer (a1) represented by the following general formula (I'), a monomer (a2) represented by the following general formula (II'), a monomer (a3) represented by the following general formula (III') and a monomer (a4) represented by the following general formula (IV'), and a constituent unit derived from a metal-atom-containing polymerizable monomer (b) containing a divalent metal atom M.

(I')

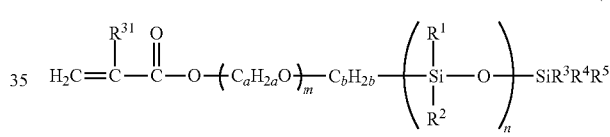

Here, in the general formula (I'), $R^{31}$ represents a hydrogen atom or a methyl group, and a, b, m, n and $R^1$ to $R^5$ represent the same meaning as mentioned above.

(II')

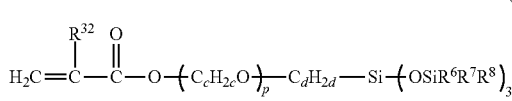

Here, in the general formula (II'), $R^{32}$ represents a hydrogen atom or a methyl group, and c, d, p and $R^6$ to $R^8$ represent the same meaning as mentioned above.

(III')

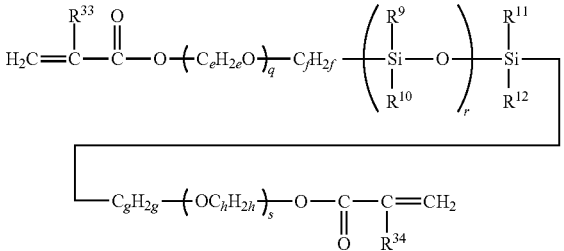

Here, in the general formula (III'), $R^{33}$ and $R^{34}$ represent a hydrogen atom or a methyl group, and e, f, g, h, q, r, s and $R^9$ to $R^{12}$ represent the same meaning as mentioned above.

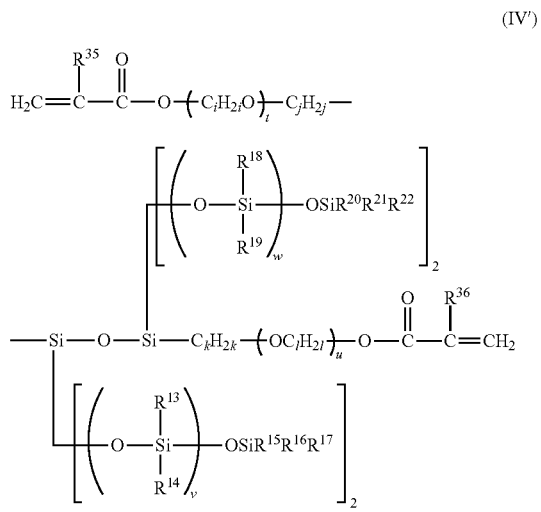
(IV')

Here, in the general formula (IV'), $R^{35}$ and $R^{36}$ represent a hydrogen atom or a methyl group, and i, j, k, l, t, u, v, w and $R^{13}$ to $R^{22}$ represent the same meaning as mentioned above.

Preferably, the metal-atom-containing polymerizable monomer (b) containing a divalent metal atom M includes at least one kind selected from the group consisting of a monomer (b1) represented by the following general formula (V') and a monomer (b2) represented by (VI').

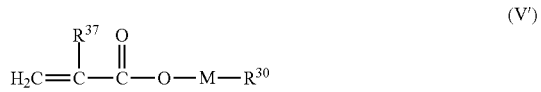
(V')

Here, in the general formula (V'). $R^{37}$ represents a hydrogen atom or a methyl group, and M and $R^{30}$ represent the same meaning as mentioned above.

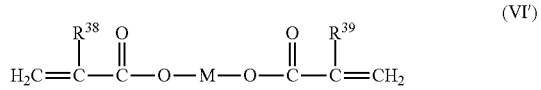
(VI')

Here, in the general formula (VI'). $R^{38}$ and $R^{39}$ represent a hydrogen atom or a methyl group, and M represents the same meaning as mentioned above.

In the hydrolyzable resin, the ratio between the content of the constituent unit derived from the silicon-containing polymerizable monomer (a) and the content of the constituent unit derived from the metal-atom-containing polymerizable monomer (b) containing a divalent metal atom M is preferably in the range of 30/70 to 90/10 by mass ratio.

The thermoplastic resin is preferably at least one kind selected from the group consisting of chlorinated paraffin, polyvinyl ether, rosin and a vinyl chloride-isobutylvinyl ether copolymer.

The plasticizer is preferably at least one kind selected from the group consisting of a phthalate ester plasticizer and a phosphate ester plasticizer.

The antifouling coating composition of the present invention may contain 0 to 20 parts by mass of an antifouling agent per 100 parts by mass of the total amount of the hydrolyzable resin, the thermoplastic resin and the plasticizer.

Also, according to the present invention, there are provided an antifouling film formed from the antifouling coating composition, and a composite film having the same. The composite film of the present invention has a primer film formed from an antirust paint, and an antifouling film formed from the antifouling coating composition overlaid on the primer film. The composite film of the present invention may further have an intermediate film formed on the entire or part of a surface of the primer film between the primer film and the antifouling film. One preferred example of the intermediate film is a coating film formed from an antifouling coating composition containing an antifouling agent.

Further, according to the present invention, an in-water structure having the antifouling film or composite film is provided. As a preferred example of the in-water structure, a ship can be recited.

Advantageous Effects of Invention

According to the antifouling coating composition of the present invention, even when an antifouling agent is not contained, or the blending amount thereof is small, high antifouling performance can be exerted stably for a long period of time, and an antifouling film that is excellent in crack resistance can be formed. The antifouling coating composition of the present invention can be suitably used as an antifouling paint for preventing surfaces or inner surfaces of in-water structures such as ships; fish nets typically for farming and other fishing equipment; harbor facilities; oil-fences; intake equipment of an electric generation plant or the like; piping such as water conduits for cooling; bridges, buoyage: industrial water system facilities; and submarine bases.

DESCRIPTION OF EMBODIMENTS

<Antifouling Coating Composition>

The antifouling coating composition of the present invention contains, as a vehicle ingredient, a hydrolyzable resin (i) having a specific silicon-containing group as will be described later and a metal-atom-containing group containing a divalent metal atom M [hereinafter, referred to simply as a hydrolyzable resin (i)], and a thermoplastic resin and/or a plasticizer (ii). The total content of the thermoplastic resin and/or plasticizer (ii) is within the range of 3 to 100 parts by mass per 100 parts by mass of the hydrolyzable resin (i). According to the antifouling coating composition of the present invention, it is possible to form an antifouling film that is hydrolyzed at an appropriate speed over a long period of time (particularly, this property is also called a self-polishing property), and hence, it is possible to obtain an antifouling film that exerts high antifouling performance stably for a long period of time (excellent in long-term antifouling property) and is excellent in crack resistance. When the antifouling coating composition is applied to a ship or the like, for example, the antifouling film is to be dipped in water (sea water or the like) for a long period of time, and repeatedly exposed to the cycle of being dipped in water for a certain term and then landed, and hence the antifouling film is requested to have such flexibility that is durable to such a condition. According to the antifouling coating composition of the present invention, it is possible to form an antifouling film that is less likely to be cracked even by dipping in water for a long period of time or by repeated cycles as mentioned above. In the following, the antifouling coating composition of the present invention will be specifically described.

[Hydrolyzable Resin (i)]

The hydrolyzable resin (i) contained in the antifouling coating composition of the present invention has at least one kind of silicon-containing group selected from the group consisting of a group represented by the following general formula (I):

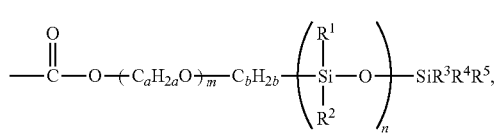
(I)

a group represented by the following general formula (II):

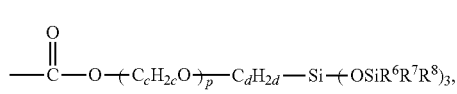
(II)

a group represented by the following general formula (III):

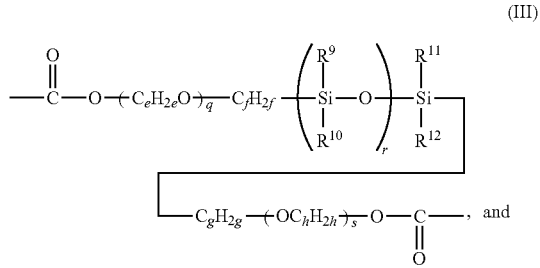
(III)

a group represented by the following general formula (IV):

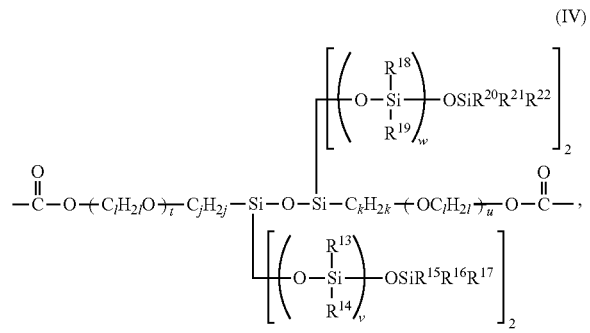
(IV)

and at least one kind of metal-atom-containing group containing a divalent metal atom M. The hydrolyzable resin (i) having such a specific silicon-containing group and a metal-atom-containing group exhibits the property of gradually hydrolyzing in water (particularly in sea water) due to the hydrolyzability of the metal-atom-containing group. Therefore, when the antifouling film formed from the antifouling coating composition containing the hydrolyzable resin (i) as a vehicle is dipped in water, its surface is self-polished, and as a result, the coating film surface is renewed, so that organisms are difficult to adhere even when an antifouling agent is not contained, and antifouling performance is exhibited until the coating film is completely exhausted.

In the general formula (I), a and b each independently represent an integer of 2 to 5, m represents an integer of 0 to 50, and n represents an integer of 3 to 80. $R^1$ to $R^5$ each independently represent an alkyl group, an alkoxy group, a phenyl group, a substituted phenyl group, a phenoxy group or a substituted phenoxy group.

In the general formula (II), c and d each independently represent an integer of 2 to 5, and p represents an integer of 0 to 50. $R^6$, $R^7$ and $R^8$ each independently represent an alkyl group, $R^a$ or $R^b$, $R^a$ is

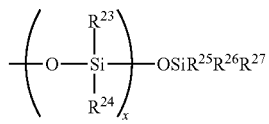

(wherein x represents an integer of 0 to 20; and $R^{23}$ to $R^{27}$ are the same or different and each represent an alkyl group), and $R^b$ is

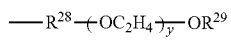

(wherein y represents an integer of 1 to 20; and $R^{28}$ and $R^{29}$ are the same or different and each represent an alkyl group).

In the general formula (III), e, f, g and h each independently represent an integer of 2 to 5, q and s each independently represent an integer of 0 to 50, and r represents an integer of 3 to 80. $R^9$ to $R^{12}$ each independently represent an alkyl group, an alkoxy group, a phenyl group, a substituted phenyl group, a phenoxy group or a substituted phenoxy group.

In the general formula (IV), i, j, k and l each independently represent an integer of 2 to 5, t and u each independently represent an integer of 0 to 50, and v and w each independently represent an integer of 0 to 20. $R^{13}$ to $R^{22}$ are the same or different and each represent an alkyl group.

The hydrolyzable resin (i) may have two or more kinds of silicon-containing groups selected from the group consisting of the groups represented by the general formulas (I), (II), (III) and (IV). In this case, the hydrolyzable resin (i) may have two or more kinds of the groups represented by the general formula (I), two or more kinds of the groups represented by the general formula (II), two or more kinds of the groups represented by the general formula (III), and/or two or more kinds of the groups represented by the general formula (IV).

Since the metal-atom-containing group containing a divalent metal atom M is able to keep the self-polishing property of the coating film stably for a long period of time, and thus allows formation of a coating film that is excellent in long-term antifouling property and excellent in crack resistance and adherence with a base, it is preferably at least one kind of group selected from the group consisting of a group represented by the following general formula (V):

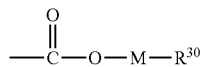

and a group represented by the following general formula (VI):

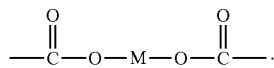

In the general formulas (V) and (VI). M represents a divalent metal atom, and $R^{30}$ represents an organic acid residue or an alcohol residue. The hydrolyzable resin (i) may have both the general formulas (V) and (VI). As the divalent metal atom M, for example, Mg. Zn and Cu can be recited, and Zn or Cu is preferred.

While the hydrolyzable resin (i) is not particularly limited insofar as it has a silicon-containing group and a metal-atom-containing group as mentioned above, an acrylic resin containing a constituent unit derived from at least one kind of the silicon-containing polymerizable monomer (a) selected from the group consisting of a monomer (a1) represented by the following general formula (I'), a monomer (a2) represented by the following general formula (II'), a monomer (a3) represented by the following general formula (III') and a monomer (a4) represented by the following general formula (IV') and a constituent unit derived from the metal-atom-containing polymerizable monomer (b) containing a divalent metal atom M may be suitably used.

Here, in the general formula (I'), $R^{31}$ represents a hydrogen atom or a methyl group, and a, b, m, n and $R^1$ to $R^5$ represent the same meaning as mentioned above.

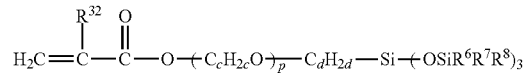

Here, in the general formula (II'), $R^{32}$ represents a hydrogen atom or a methyl group, and c, d, p and $R^6$ to $R^8$ represent the same meaning as mentioned above.

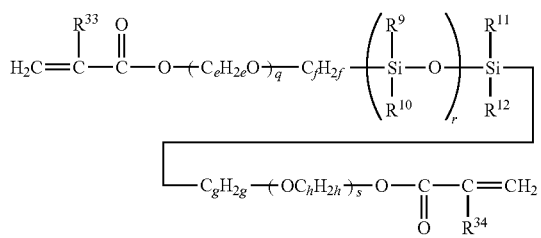

Here, in the general formula (III'), $R^{33}$ and $R^{34}$ represent a hydrogen atom or a methyl group, and e, f, g, h, q, r, s and $R^9$ to $R^{12}$ represent the same meaning as mentioned above.

(IV')

Here, in the general formula (IV'), $R^{35}$ and $R^{36}$ represent a hydrogen atom or a methyl group, and i, j, k, l, t, u, v, w and $R^{13}$ to $R^{22}$ represent the same meaning as mentioned above.

The monomer (a1) represented by the general formula (I'), the monomer (a2) represented by the general formula (II'), the monomer (a3) represented by the general formula (III') and the monomer (a4) represented by the general formula (IV') are respectively silicon-containing polymerizable

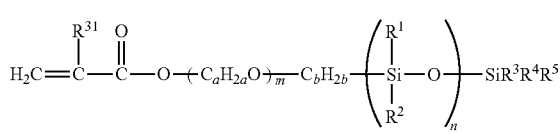

monomers having silicon-containing groups represented by the general formulas (I), (II), (III) and (IV).

Since the metal-atom-containing polymerizable monomer (b) containing a divalent metal atom M as mentioned above is able to keep the self-polishing property of a coating film stably for a long period of time, and thus is able to form a coating film having an excellent long-term antifouling property, and excellent crack resistance and adherence with a base, it preferably contains at least one kind selected from the group consisting of the monomer (b1) represented by the following general formula (V') and the monomer (b2) represented by (VI').

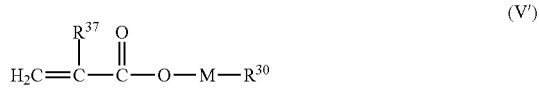

Here, in the general formula (V'), $R^{37}$ represents a hydrogen atom or a methyl group, and M and $R^{30}$ represent the same meaning as mentioned above.

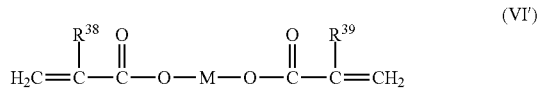

Here, in the general formula (VI'), $R^{38}$ and $R^{39}$ represent a hydrogen atom or a methyl group, and M represents the same meaning as mentioned above.

The monomer (b1) represented by the general formula (V') and the monomer (b2) represented by the general formula (VI') are respectively metal-atom-containing polymerizable monomers having metal-atom-containing groups represented by the general formulas (V) and (VI).

[1] Silicon-Containing Polymerizable Monomer (a)

The silicon-containing polymerizable monomer (a1) that can form the hydrolyzable resin (i) is represented by the general formula (I'), and in the formula, a and b each independently represent an integer of 2 to 5, m represents an integer of 0 to 50, and n represents an integer of 3 to 80. $R^1$ to $R^5$ each independently represent an alkyl group, an alkoxy group, a phenyl group, a substituted phenyl group, a phenoxy group or a substituted phenoxy group, and $R^{31}$ represents a hydrogen atom or a methyl group. By using the silicon-containing polymerizable monomer (a1) as the silicon-containing polymerizable monomer (a), the hydrolyzable resin (i) which is an acrylic resin having a silicon-containing group represented by the general formula (I) in a side chain is obtained.

In the general formula (I') (ditto with the general formula (I), ditto with the following), m represents the average polymerization degree of a polyether structure, and may be 0, but is preferably more than 0 because there is a tendency that the recoating property with an old coating film is excellent. Further, m is preferably 50 or less because the water resistance of the coating film tends to be excellent, and is preferably 30 or less because the recoating property with an old coating film tends to be excellent. m is more preferably in the range of 3 to 25, and is further preferably in the range of 5 to 20.

In the general formula (I'), a is preferably 2 or 3, and the one wherein a is 2 and the one wherein a is 3 may be used together, b is preferably 2 or 3.

In the general formula (I'), n represents the average polymerization degree of a silicon-containing structure, and is an integer in the range of 3 to 80. By setting n to 3 or larger, it is possible to develop a higher antifouling effect. Also by setting n to 80 or less, excellent compatibility with other polymerizable monomers is exhibited, and solubility in a general organic solvent of the obtained hydrolyzable resin (i) can be improved. n is preferably in the range of 5 to 50, and is more preferably in the range of 8 to 40.

In the general formula (I'), $R^1$ to $R^5$ are preferably an alkyl group having 1 to 18 carbon atoms, more preferably a methyl group or an ethyl group, and further preferably a methyl group.

Concrete examples of the silicon-containing polymerizable monomer (a1) represented by the general formula (I') include "FM-0711", "FM-0721", and "FM-0725" (trade names) which are products of CHISSO CORPORATION, and "X-24-8201", "X-22-174DX", and "X-22-2426" (trade names) which are products of Shin-Etsu Chemical Co., Ltd. as those wherein m is 0. As those wherein m is more than 0, "F2-254-04" and "F2-254-14" (trade names) which are products of Nippon Unicar Company Limited and so on are recited. While products of Nippon Unicar Company Limited as the concrete examples of the silicon-containing polymerizable monomer (a1) are described by their trade names, silicone business in Nippon Unicar Company Limited was assigned to Dow Corning Toray Co., Ltd. in 2004, and corresponding products are now available from the assignee. This also applies to the products of Nippon Unicar Company Limited as will be described below.

The hydrolyzable resin (i) may contain two or more kinds of constituent units derived from the silicon-containing polymerizable monomer (a1)) as the silicon-containing polymerizable monomer (a).

The silicon-containing polymerizable monomer (a2) that can form the hydrolyzable resin (i) is represented by the general formula (II'), and in the formula, c and d each independently represent an integer of 2 to 5, and p represents an integer of 0 to 50. $R^6$, $R^7$ and $R^8$ each independently represent an alkyl group. $R^a$ or $R^b$, and $R^{32}$ represents a hydrogen atom or a methyl group. $R^a$ and $R^b$ are as described above. By using the silicon-containing polymerizable monomer (a2) as the silicon-containing polymerizable monomer (a), the hydrolyzable resin (i) which is an acrylic resin having a silicon-containing group represented by the general formula (II) in a side chain is obtained.

In the general formula (II') (ditto with the general formula (II), ditto with the following), p represents the average polymerization degree of a polyether structure, and may be 0, but is preferably more than 0 because there is a tendency that the recoating property with an old coating film is excellent. Further, p is preferably 50 or less because the water resistance of the coating film tends to be excellent, and is preferably 30 or less because the recoating property with an old coating film tends to be excellent. p is more preferably in the range of 3 to 25, and is further preferably in the range of 5 to 20.

In the general formula (II'), c is preferably 2 or 3, and the one wherein c is 2 and the one wherein c is 3 may be used together. d is preferably 2 or 3.

In the general formula (II'), x and y each represent the average polymerization degree of a silicon-containing structure or a polyether structure introduced into a side chain, and is an integer in the range of 0 to 20 and an integer in the range of 1 to 20, respectively. By setting x and y to 20 or less, excellent compatibility with other polymerizable monomers is exhibited, and solubility of the obtained hydrolyzable resin (i) in a general organic solvent can be improved. x and y are preferably in the range of 10 or less, and more preferably in the range of 5 or less.

In the general formula (II'), as an alkyl group that can be selected in $R^6$ to $R^8$ and $R^{23}$ to $R^{29}$, for example, a methyl group, an ethyl group, a n-propyl group, a n-butyl group and the like are recited. A methyl group or an ethyl group are preferred, and a methyl group is more preferred.

Concrete examples of the silicon-containing polymerizable monomer (a2) represented by the general formula (II') include "TM-0701" (trade name) which is a product of CHISSO CORPORATION, "X-22-2404" (trade name) which is a product of Shin-Etsu Chemical Co., Ltd., and "F2-250-01" and "F2-302-01" (trade names) which are products of Nippon Unicar Company Limited as those wherein p is 0. As those wherein p is more than 0, "F2-302-04" (trade name) which is a product of Nippon Unicar Company Limited and so on are recited.

The hydrolyzable resin (i) may contain two or more kinds of constituent units derived from the silicon-containing polymerizable monomer (a2) as the silicon-containing polymerizable monomer (a).

The silicon-containing polymerizable monomer (a3) that can form the hydrolyzable resin (i) is represented by the general formula (III'), and in the formula, e, f, g and h each independently represent an integer of 2 to 5, q and s each independently represent an integer of 0 to 50, and r represents an integer of 3 to 80. $R^9$ to $R^{12}$ each independently represent an alkyl group, an alkoxy group, a phenyl group, a substituted phenyl group, a phenoxy group or a substituted phenoxy group, and $R^{33}$ and $R^{34}$ represent a hydrogen atom or a methyl group. By using the silicon-containing polymerizable monomer (a3) as the silicon-containing polymerizable monomer (a), the hydrolyzable resin (i) which is an acrylic resin having a silicon-containing group represented by the general formula (III) (This silicon-containing group is a cross-linking group that cross-links polymer main chains.) is obtained.

In the general formula (III') (ditto with the general formula (III), ditto with the following), q and s represent the average polymerization degree of a polyether structure, and may be 0, but are preferably more than 0 because there is a tendency that the recoating property with an old coating film is excellent. Further, q and s are preferably 50 or less because the water resistance of the coating film tends to be excellent, and are preferably 30 or less because the recoating property with an old coating film tends to be excellent. q and s are more preferably in the range of 3 to 25, and are further preferably in the range of 5 to 20.

In the general formula (III'), e and h are preferably 2 or 3, and those wherein e and h are 2 and 3 may be used together, f and g are preferably 2 or 3.

In the general formula (III'), r represents the average polymerization degree of a silicon-containing structure, and is an integer in the range of 3 to 80. By setting r to 3 or larger, it is possible to develop a higher antifouling effect. Also by setting r to 80 or less, excellent compatibility with other polymerizable monomers is exhibited, and solubility in a general organic solvent of the obtained hydrolyzable resin (i) can be improved. r is preferably in the range of 5 to 50, and is more preferably in the range of 8 to 40.

In the general formula (III'). $R^9$ to $R^{12}$ are preferably an alkyl group having 1 to 18 carbon atoms, more preferably a methyl group or an ethyl group, and further preferably a methyl group.

Concrete examples of the silicon-containing polymerizable monomer (a3) represented by the general formula (III') include "FM-7711", "FM-7721", and "FM-7725" (trade names) which are products of CHISSO CORPORATION, and "F2-311-02" (trade name) which is a product of Nippon Unicar Company Limited as those wherein q and s are 0. As those wherein q and s are more than 0, "F2-354-04" (trade name) which is a product of Nippon Unicar Company Limited and so on are recited.

The hydrolyzable resin (i) may contain two or more kinds of constituent units derived from the silicon-containing polymerizable monomer (a3) as the silicon-containing polymerizable monomer (a).

The silicon-containing polymerizable monomer (a4) that can form the hydrolyzable resin (i) is represented by the general formula (IV'), and in the formula, i, j, k and l each independently represent an integer of 2 to 5, t and u each independently represent an integer of 0 to 50, and v and w each independently represent an integer of 0 to 20. $R^{13}$ to $R^{22}$ are the same or different and each represent an alkyl group, and $R^{35}$ and $R^{36}$ represent a hydrogen atom or a methyl group. By using the silicon-containing polymerizable monomer (a4) as the silicon-containing polymerizable monomer (a), the hydrolyzable resin (i) which is an acrylic resin having a silicon-containing group represented by the general formula (IV) (This silicon-containing group is a cross-linking group that cross-links polymer main chains.) is obtained.

In the general formula (IV') (ditto with the general formula (IV), ditto with the following), t and u each represent the average polymerization degree of a polyether structure, and may be 0, but is preferably more than 0 because there is a tendency that the recoating property with an old coating film is excellent. Further, t and u are preferably 50 or less because the water resistance of the coating film tends to be excellent, and are preferably 30 or less because the recoating property with an old coating film tends to be excellent. t and u are more preferably in the range of 3 to 25, and are further preferably in the range of 5 to 20.

In the general formula (IV'), i and l are preferably 2 or 3, and those wherein i and l are 2 and 3 may be used together. j and k are preferably 2 or 3.

In the general formula (IV'), v and w each represent the average polymerization degree of a silicon-containing structure introduced into a side chain, and are an integer in the range of 0 to 20. By setting v and w to 20 or less, excellent compatibility with other polymerizable monomers is exhibited, and solubility of the obtained hydrolyzable resin (i) in a general organic solvent can be improved. v and w are preferably in the range of 10 or less, and more preferably in the range of 5 or less.

In the general formula (IV'), as an alkyl group that can be selected in $R^{13}$ to $R^{22}$, for example, a methyl group, an ethyl group, a n-propyl group, a n-butyl group and the like are recited. A methyl group or an ethyl group are preferred, and a methyl group is more preferred.

Concrete examples of the silicon-containing polymerizable monomer (a4) represented by the general formula (IV') include "F2-312-01" (trade name) which is a product of Nippon Unicar Company Limited, for example, as those wherein t and u are 0. As those wherein t and u are more than 0, "F2-312-04" (trade name) which is a product of Nippon Unicar Company Limited and so on are recited.

The hydrolyzable resin (i) may contain two or more kinds of constituent units derived from the silicon-containing polymerizable monomer (a4) as the silicon-containing polymerizable monomer (a).

The hydrolyzable resin (i) may contain constituent units derived from two or more kinds of silicon-containing polymerizable monomers selected from the silicon-containing polymerizable monomers (a1), (a2), (a3) and (a4). Among these, as one preferred embodiment, a form using both a polymerizable monomer containing (meth)acryl-modified silicon at one terminal [silicon-containing polymerizable monomer (a1) and/or (a2)] and a polymerizable monomer containing (meth)acryl-modified silicon at both terminals [silicon-containing polymerizable monomer (a3) and/or (a4)] can be recited.

Among the entire constituent units forming the hydrolyzable resin (i), the content of the constituent unit derived from the silicon-containing polymerizable monomer (a) is preferably 1 to 60% by mass, more preferably 5 to 50% by mass, and further preferably 10 to 40% by mass. With the content of 1% by mass or more, an antifouling effect tends to appear even when an antifouling agent is not separately contained, and with the content of 60% by mass or less, a good balance between a long-term antifouling property and adherence with a base tends to be obtained.

[2] Metal-Atom-Containing Polymerizable Monomer (b)

The metal-atom-containing polymerizable monomer (b) is a monomer for introducing a metal-atom-containing group containing a divalent metal atom M into the hydrolyzable resin (i). Without a metal-atom-containing group, the hydrolyzability of the obtained resin is insufficient so that an excellent self-polishing property of a coating film is not obtained, and it is difficult to obtain a coating film exhibiting an excellent antifouling property. Without a metal-atom-containing group, adherence with a base and crack resistance of a coating film tend to be defective. As the divalent metal atom M, Mg, Zn, Cu and so on can be recited, and Zn or Cu is preferable.

The metal-atom-containing polymerizable monomer (b1)) that can form the hydrolyzable resin (i) is represented by the general formula (V'), and in the formula. $R^{37}$ represents a hydrogen atom or a methyl group. M represents a divalent metal atom, and $R^{30}$ represents an organic acid residue or an alcohol residue. By using the metal-atom-containing polymerizable monomer (b1) as the metal-atom-containing polymerizable monomer (b), the hydrolyzable resin (i) which is an acrylic resin having a metal-atom-containing group represented by the general formula (V) is obtained.

In $R^{30}$, as an organic acid forming an organic acid residue, for example, monobasic organic acids such as acetic acid, monochloroacetic acid, monofluoroacetic acid, propionic acid, caproic acid, caprylic acid, 2-ethylhexyl acid, capric acid, versatic acid, isostearic acid, palmitic acid, cresotinic acid, oleic acid, elaidic acid, linoleic acid, linolenic acid, stearolic acid, ricinoleic acid, ricinoelaidic acid, brassidic acid, erucic acid, α-naphthoic acid, β-naphthoic acid, benzoic acid, 2,4,5-trichlorophenoxyacetic acid, 2,4-dichlorophenoxyacetic acid, quinoline carboxylic acid, nitrobenzoic acid, nitronaphthalenecarboxylic acid, and pyruvic acid are recited. Among these, using the one having a fatty acid organic acid residue is preferred because a coating film without cracking and peeling tends to be kept for a long period of time. In particular, zinc oleate (meth)acrylate or zinc versatate (meth)acrylate having high flexibility is preferably used as the metal-atom-containing polymerizable monomer (b1).

As other preferred organic acids, monobasic cyclic organic acids other than aromatic organic acids can be recited. As monobasic cyclic organic acids, for example, those having a cycloalkyl group such as naphthenic acid, and resin acids such as tricyclic resin acids and salts thereof can be recited. As a tricyclic resin acid, for example, a monobasic acid having a diterpene hydrocarbon backbone can be recited, and as such, for example, compounds having abietane, pimarane, isopimarane, and labdane backbones can be recited. More concretely, for example, abietic acid, neoabietic acid, dehydroabietic acid, hydrogenated abietic acid, palustris acid, pimaric acid, isopimaric acid, levopimaric acid, dextropimaric acid, sandaracopimaric acid, and salts thereof are recited. Among these, abietic acid, hydrogenated abietic acid and salts thereof are preferred because hydrolysis appropriately occurs, and an excellent long-term antifouling property and excellent crack resistance of a coating film are obtained, and the acids are easily available.

The monobasic cyclic organic acid does not have to be highly purified, and, for example, pine resin, resin acid of pine and so on may be used. As such, for example, rosin, hydrogenated rosin, disproportionated rosin and naphthenic acid can be recited. The rosin referred to herein includes gum rosin, wood rosin, tall oil rosin and so on. Rosin, hydrogenated rosin and disproportionated rosin are preferred in that they are cheap and easily available, and excellent in handleability and exert a long-term antifouling property.

The acid value of the monobasic cyclic organic acid is preferably 100 mg KOH/g or more and 220 mg KOH/g or less, more preferably 120 mg KOH/g or more and 190 mg KOH/g or less, and further preferably 140 mg KOH/g or more and 185 mg KOH/g or less. When the one having an acid value within the above range is used as a monobasic cyclic organic acid forming $R^{30}$, the hydrolysis speed of the hydrolyzable resin (i) is appropriate, so that the self-polishing property of the coating film can be kept stably for a long period of time, and thus the antifouling effect can be kept for a longer term.

An organic acid residue of the metal-atom-containing polymerizable monomer (b1) may be formed of only one kind of organic acid or two or more kinds of organic acids.

As a production method of the metal-atom-containing polymerizable monomer (b1) having an organic acid residue as $R^{30}$, for example, a method of reacting an inorganic metal compound, with a carboxylic group-containing radical polymerizable monomer such as (meth)acrylic acid, and a nonpolymerizable organic acid (an organic acid forming the organic acid residue) in an organic solvent containing an alcoholic compound can be recited. A constituent unit derived from the metal-atom-containing polymerizable monomer (b1) may be formed by a method of reacting a resin obtainable by polymerization of a monomer mixture containing a carboxylic group-containing radical polymerizable monomer such as (meth)acrylic acid, with a metal compound, and a nonpolymerizable organic acid (an organic acid forming the organic acid residue).

The metal-atom-containing polymerizable monomer (b2) that can form the hydrolyzable resin (i) is represented by the general formula (VI'), and in the formula. $R^{38}$ and $R^{39}$ represent a hydrogen atom or a methyl group, and M represents a divalent metal atom. By using the metal-atom-containing polymerizable monomer (b2) as the metal-atom-containing polymerizable monomer (b), the hydrolyzable resin (i) which is an acrylic resin having a metal-atom-containing group (this metal-atom-containing group is a cross-linking group that cross-links polymer main chains) represented by the general formula (VI) is obtained.

Concrete examples of the metal-atom-containing polymerizable monomer (b2) include magnesium acrylate [$(CH_2=CHCOO)_2Mg$], magnesium methacrylate [$(CH_2=C(CH_3)COO)_2Mg$], zinc acrylate [$(CH_2=CHCOO)_2Zn$], zinc methacrylate [$(CH_2=C(CH_3)$ COO)$_2$Zn], copper acrylate [(CH$_2$=CHCOO)$_2$Cu], and copper methacrylate [(CH$_2$=C(CH$_3$)COO)$_2$Cu]. These may be used alone or in combination of two or more kinds that are appropriately selected as necessary.

As a production method of the metal-atom-containing polymerizable monomer (b2), for example, a method of reacting a polymerizable unsaturated organic acid such as (meth)acrylic acid with a metal compound in an organic solvent containing an alcoholic compound together with water can be recited. In this case, it is preferred to adjust the content of water in the reactant within the range of 0.01 to 30% by mass.

The hydrolyzable resin (i) may contain both a constituent unit derived from the metal-atom-containing polymerizable monomer (b1) and a constituent unit derived from the metal-atom-containing polymerizable monomer (b2). When both the metal-atom-containing polymerizable monomer (b1) and the metal-atom-containing polymerizable monomer (b2) are used as monomers forming the hydrolyzable resin (i), the ratio between contents of the constituent unit derived from the metal-atom-containing polymerizable monomer (b1) and the constituent unit derived from the metal-atom-containing polymerizable monomer (b2) in the hydrolyzable resin (i) is preferably in the range of 20/80 to 80/20 (molar ratio), and is more preferably in the range of 30/70 to 70/30 (molar ratio). By adjusting the ratio of contents within this range, an antifouling film exerting an excellent antifouling property for a long period of time and having excellent crack resistance and adherence with a base tends to be easily obtained even when no or a small amount of antifouling agent is contained.

In the entire constituent units forming the hydrolyzable resin (i), the content of the constituent unit derived from the metal-atom-containing polymerizable monomer (b) is preferably 5 to 30% by mass, and more preferably 10 to 20% by mass. By setting the content to 5% by mass or more, adherence with a base improves, and the self-polishing property of a coating film formed therefrom tends to be kept stably for a longer term, and by setting the content to 30% by mass or less, the effect of improving the balance between the long-term self-polishing property, and crack resistance after dipping in sea water and adherence with a base becomes more significant, and the long-term self-polishing property is kept, and physical properties of a coating film tend to improve.

In the hydrolyzable resin (i), the ratio between the content of the constituent unit derived from the silicon-containing polymerizable monomer (a) and the content of the constituent unit derived from the metal-atom-containing polymerizable monomer (b) is preferably in the range of 30/70 to 90/10 by mass ratio, and is more preferably in the range of 45/55 to 85/15. By setting the ratio to 30/70 or more, an antifouling effect tends to develop even when an antifouling agent is not separately contained. When the ratio is less than 30/70, flexibility of a coating film obtained therefrom can be impaired, or the self-polishing property of the coating film can be too high. By setting the ratio to 90/10 or less, an excellent balance between the long-term antifouling property and adherence with a base tends to be obtained. When the ratio exceeds 90/10, hydrolysis of a coating film obtained therefrom can be impaired, so that there is a possibility that the self-polishing property of the coating film is impaired.

[3] Different Monomer Component (c)

The hydrolyzable resin (i) may contain a constituent unit derived from a monomer component (c) other than the silicon-containing polymerizable monomer (a) and the metal-atom-containing polymerizable monomer (b).

The different monomer component (c) is not particularly limited insofar as it is an unsaturated monomer capable of copolymerizing with the silicon-containing polymerizable monomer (a) and the metal-atom-containing polymerizable monomer (b), and for example, (meth)acrylic acid ester monomers such as methyl (meth)acrylate, ethyl (meth)acrylate, 2-methoxyethyl (meth)acrylate, 2-ethoxyethyl (meth)acrylate, phenoxyethyl (meth)acrylate, 2-(2-ethylhexaoxy) ethyl (meth)acrylate, 1-methyl-2-methoxyethyl (meth)acrylate, 3-methoxybutyl (meth)acrylate, 3-methyl-3-methoxybutyl (meth)acrylate, m-methoxyphenyl (meth)acrylate, p-methoxyphenyl (meth)acrylate, o-methoxyphenylethyl (meth)acrylate, m-methoxyphenylethyl (meth)acrylate, p-methoxyphenylethyl (meth)acrylate, n-propyl (meth)acrylate, i-propyl (meth)acrylate, n-butyl (meth)acrylate, i-butyl (meth)acrylate, t-butyl (meth)acrylate, 2-ethylhexyl (meth)acrylate, lauryl (meth)acrylate, stearyl (meth)acrylate, benzyl (meth)acrylate, phenyl (meth)acrylate, isobornyl (meth)acrylate, cyclohexyl (meth)acrylate and glycidyl (meth)acrylate; hydroxy group-containing monomers such as 2-hydroxyethyl (meth)acrylate, 2-hydroxypropyl (meth)acrylate, 3-hydroxypropyl (meth)acrylate, 2-hydroxybutyl (meth)acrylate and 4-hydroxybutyl (meth)acrylate; adducts of 2-hydroxyethyl(meth)acrylate, with ethylene oxide, propylene oxide, γ-butyrolactone, ε-caprolactone or the like; dimers or trimers such as 2-hydroxyethyl (meth)acrylate and 2-hydroxypropyl (meth)acrylate; monomers having plural hydroxy groups such as glycerol (meth)acrylate; primary and secondary amino group-containing vinyl monomers such as butylaminoethyl (meth)acrylate and (meth)acrylamide; tertiary amino group-containing vinyl monomers such as dimethylaminoethyl (meth)acrylate, diethylaminoethyl (meth)acrylate, dimethylaminopropyl (meth)acrylate, dimethylaminobutyl (meth)acrylate, dibutylaminoethyl (meth)acrylate, dimethylaminoethyl (meth)acrylamide and dimethylaminopropyl (meth)acrylamide: heterocyclic basic monomers such as vinyl pyrrolidone, vinyl pyridine and vinyl carbazole: and vinyl monomers such as styrene, vinyltoluene, α-methylstyrene, (meth)acrylonitrile, vinyl acetate and vinyl propionate can be recited.

The content of the constituent unit derived from the different monomer component (c) in the entire constituent units forming the hydrolyzable resin (i) is preferably 0.1 to 89% by mass, more preferably 7 to 75% by mass, and further preferably 10 to 70% by mass. By setting the content to 0.1% by mass or more, it becomes possible to regulate the balance of various characteristics of the antifouling coating composition obtained therefrom, and by setting the content to 89% by mass or less, the coating film formed therefrom is provided with excellent hydrolyzability for a long period of time, and an excellent antifouling property appears even when an antifouling agent is not used, and the balance with adherence of the coating film with respect to a base tends to be excellent.

The production method of the hydrolyzable resin (i) is not particularly limited, and for example, a method of reacting a monomer mixture of the aforementioned monomers in the presence of a radical initiator at a reaction temperature of 60 to 180° C. for 5 to 14 hours. As the radical initiator, for example, 2,2-azobisisobutyronitrile, 2,2-azobis(2,4-dimethylvaleronitrile), 2,2-azobis(2-methylbutyronitrile), benzoyl peroxide, cumene hydroperoxide, lauryl peroxide, di-t-butylperoxide, t-butylperoxy-2-ethylhexanoate and the like are recited. As a polymerization method, an emulsion polymerization method, a suspension polymerization method and the like can be employed in addition to a solution polymerization method carried out in an organic solvent, however, a solution polymerization method using a general organic solvent such as toluene, xylene, methyl isobutyl ketone, or n-butyl acetate is advantageous from the view point of productivity and performance of the hydrolyzable resin (i).

Also, when the metal-atom-containing polymerizable monomer (b2) is used, it is preferred to use a chain transfer agent to make the antifouling coating composition highly solid, to improve the productivity and to prevent generation of cullet at the time of polymerization. As the chain transfer agent, a chain transfer agent other than mercaptan, such as a styrene dimer is preferred from the view point of compatibility with the metal-atom-containing polymerizable monomer (h).

The weight average molecular weight of the hydrolyzable resin (i) is generally within the range of 1000 to 3000000, preferably within the range of 3000 to 100000, and more preferably within the range of 5000 to 50000, although it differs depending on the polymerization condition. When the weight average molecular weight is 1000 or more, an antifouling property tends to appear when a coating film is formed, and when the weight average molecular weight is 3000000 or less, the hydrolyzable resin (i) tends to be dispersed uniformly in the coating composition. The weight average molecular weight referred to herein means the weight average molecular weight in terms of polystyrene measured by gel permeation chromatography (GPC).

The fact that the hydrolyzable resin (i) is a resin containing one or more kinds of silicon-containing groups represented by the general formulas (I) to (IV) (a resin containing a constituent unit derived from one or more kinds of the silicon-containing polymerizable monomers (a1) to (a4)) can be confirmed by using, for example, $^1$H-NMR, ICP emission spectrometry. The fact that the hydrolyzable resin (i) is a resin containing one or more kinds of the metal-atom-containing groups represented by the general formulas (V) to (VI) (a resin containing a constituent unit derived from one or more kinds of the metal-atom-containing polymerizable monomers (b1) to (b2)) can be confirmed, for example, by using atomic absorption spectrometry.

In the antifouling coating composition of the present invention, the content of the hydrolyzable resin (i) is preferably 30 to 97% by mass in solids contained in the antifouling coating composition. When the content is less than 30% by mass, adherence of the coating film with respect to a base deteriorates, and an antifouling effect tends not to be sufficiently exerted. When the content is more than 97% by mass, crack resistance of the coating film tends to deteriorate. Solids contained in an antifouling coating composition refers to the sum of the ingredients other than a solvent contained in the antifouling coating composition.

[Thermoplastic Resin and/or Plasticizer (ii)]

The antifouling coating composition of the present invention contains the thermoplastic resin and/or plasticizer (ii) together with the hydrolyzable resin (i). By adding the thermoplastic resin and/or plasticizer (ii), crack resistance of a coating film can be improved. Since it becomes possible to control the polishing rate (polishing speed) of the coating film to an appropriate speed, it is advantageous also in the point of the long-term antifouling property of the coating film.

As the thermoplastic resin, for example, chlorinated paraffin; chlorinated polyolefins such as chlorinated rubber, chlorinated polyethylene and chlorinated polypropylene; polyvinyl ether; polypropylene sebacate; partially hydrogenated terphenyl; polyvinyl acetate; poly(meth)acrylic acid alkyl esters such as methyl (meth)acrylate copolymers, ethyl (meth)acrylate copolymers, propyl (meth)acrylate copolymers, butyl (meth)acrylate copolymers and cyclohexyl (meth)acrylate copolymers; polyether polyols; alkyd resins; polyester resins; vinyl chloride resins such as a vinyl chloride-vinyl acetate copolymer, a vinyl chloride-vinyl propionate copolymer, a vinyl chloride-isobutyl vinyl ether copolymer, a vinyl chloride-isopropyl vinyl ether copolymer and a vinyl chloride-ethyl vinyl ether copolymer; silicon oil; fats and oils and purified substances thereof; vaseline; liquid paraffin; rosin, hydrogenated rosin, naphthenic acid, fatty acids and divalent metal salts thereof; and so on can be recited. Examples of the fats and oils and purified substances thereof include fats and oils that are solid at normal temperature, such as, for example, wax (including animal-derived wax such as bees wax, plant-derived wax and so on) and fats and oils that are liquid at normal temperature such as castor oil. These thermoplastic resins may be used alone or in combination of two or more kinds.

Among the above, chlorinated paraffin, polyvinyl ether, polyether polyols, rosin, and a vinyl chloride-isobutyl vinyl ether copolymer are particularly preferred, and in particular, chlorinated paraffin, polyvinyl ether, rosin and a vinyl chloride-isobutyl vinyl ether copolymer can be more preferably used because they are suited for adjusting plasticity of a coating film and an exhausted amount of a coating film.

As the plasticizer, for example, phthalate ester plasticizers such as dioctyl phthalate (DOP), dimethyl phthalate, dicyclohexyl phthalate and diisodecyl phthalate (DIDP): aliphatic dibasic acid ester plasticizers such as isobutyl adipate and dibutyl sebacate: glycol ester plasticizers such as diethyleneglycol dibenzoate and pentaerythritol alkyl ester; phosphate ester plasticizers such as tricresyl phosphoric acid (tricresyl phosphate), triaryl phosphoric acid (triaryl phosphate) and trichloroethyl phosphoric acid; epoxy plasticizers such as epoxy soybean oil and octyl epoxystearate; organotin plasticizers such as dioctyl tin laurate and dibutyl tin laurate; trioctyl trimellitate, triacetylene and the like can be recited. These plasticizers may be used alone or in combination of two or more kinds.

Among these, phthalate ester plasticizers such as dioctyl phthalate (DOP), dimethyl phthalate, dicyclohexyl phthalate and diisodecyl phthalate (DIDP), and phosphate ester plasticizers such as tricresyl phosphoric acid (tricresyl phosphate), triaryl phosphoric acid (triaryl phosphate) and trichloroethyl phosphoric acid are particularly excellent in compatibility with the hydrolyzable resin and the thermoplastic resin, and are able to improve crack resistance uniformly over the entire coating film, and hence can be preferably used.

The antifouling coating composition of the present invention may contain only a thermoplastic resin, or only a plasticizer, or contain both of a thermoplastic resin and a plasticizer. Using both a thermoplastic resin and a plasticizer is preferred because a coating film having excellent toughness and plasticity is obtained.

The total content of the thermoplastic resin and/or plasticizer (ii) is within the range of 3 to 100 parts by mass, and preferably 5 to 50 parts by mass per 100 parts by mass of the hydrolyzable resin (i). When the total content of the thermoplastic resin and/or plasticizer (ii) is less than 3 parts by mass per 100 parts by mass of the hydrolyzable resin (i), the effect of improving the crack resistance by addition of the thermoplastic resin and/or plasticizer (ii) tends not to be recognized, and when the content of the thermoplastic resin and/or plasticizer (ii) is extremely small or the thermoplastic resin and/or plasticizer (ii) is not contained, an appropriate polishing rate (polishing speed) is not obtained, and a long-term antifouling property may not be imparted. Further, when the total content of the thermoplastic resin and/or plasticizer (ii) exceeds 100 parts by mass per 100 parts by mass of the hydrolyzable resin (i), adherence of the coating film with a base deteriorates, and the antifouling property tends to deteriorate.

[Antifouling Agent]

While an antifouling film obtained from the antifouling coating composition of the present invention exerts excellent antifouling performance owing to the antifouling effect based on the self-polishing property exhibited by the hydrolyzable resin (i), the antifouling coating composition may be mixed with an antifouling agent as necessary for further improving the antifouling performance or further improving long-term continuity of the antifouling property. As the antifouling agent, those known in the art may be used without particular limitation, and for example, inorganic compounds, organic compounds containing a metal and organic compounds not containing a metal can be recited.

Concrete examples of the antifouling agent include metal salts such as zinc oxide; cuprous oxide; manganese ethylene-bis-dithiocarbamate; zinc dimethyldithiocarbamate; 2-methylthio-4-t-butylamino-6-cyclopropylamino-s-triazine; 2,4,5,6-tetrachloroisophthalonitrile; N,N-dimethyldichlorophenyl urea; zinc ethylene-bis-dithiocarbamate; rhodan copper (cuprous thiocyanate); 4,5-dichloro-2-n-octyl-4-isothiazoline-3-on (4,5,-dichloro-2-n-octyl-3(2H) isothiazolone); N-(fluorodichloromethylthio)phthalimide; N,N'-dimethyl-N'-phenyl-(N-fluorodichloromethylthio)sulfamide; 2-pyridinethiol-1-oxide zinc salt (zinc pyrithione) and copper salt (copper pyrithione); tetramethylthiuram disulfide; 2,4,6-trichlorophenyl maleimide; 2,3,5,6-tetrachloro-4-(methylsulfonyl)pyridine; 3-iodo-2-propylbutyl carbamate; diiodomethyl-para-trisulfone; phenyl(bispyridyl) bismuth dichloride; 2-(4-thiazolyl)-benzimidazole; triphenylboronpyridine salt; stearylamine-triphenylboron; laurylamine-triphenylboron; his dimethyl dithiocarbamoyl zinc ethylenebisdithiocarbamate; 1,1-dichloro-N-[(dimethylamino)sulfonyl]-1-fluoro-N-phenylmethanesulfenamide; 1,1-dichloro-N-[(dimethylamino)sulfonyl]-1-fluoro-N-(4-methylphenyl)methanesulfenamide; N'-(3,4-dichlorophenyl)-N,N'-dimethyl urea; N'-tert-butyl-N-cyclopropyl-6-(methylthio)-1,3,5-triazine-2,4-diamine; and 4-bromo-2-(4-chlorophenyl)-5-(trifluoromethyl)-1H-pyrrole-3-carbonitrile and so on can be recited. These antifouling agents may be used alone or in combination of two or more kinds.

The content of the antifouling agent may be 20 parts by mass or less per 100 parts by mass of the total amount of the hydrolyzable resin (i) and the thermoplastic resin and/or plasticizer (ii) (that is, the hydrolyzable resin (i), the thermoplastic resin and the plasticizer). When the content of the antifouling agent is more than 20 parts by mass, defects such as cracking and peeling can arise in the coating film.

[Other Additives]

The antifouling coating composition of the present invention may contain other additives than the hydrolyzable resin (i) and the thermoplastic resin and/or plasticizer (ii). As other additives, for example, a pigment, a solvent, a water binder, an anti-sagging agent, an anti-flooding agent, an anti-settling agent, a defoaming agent, a coating film exhaustion conditioner, a UV absorber, a surface conditioner, a viscosity conditioner, a leveling agent, a pigment disperser and so on can be recited.

As the pigment, for example, extender pigments such as sedimentary barium, talc, clay, chalk, silica white, alumina white, bentonite, calcium carbonate, magnesium carbonate, silicic acid, silicates, aluminum oxide hydrates and calcium sulfate; and coloring pigments such as titanium oxide, zircon oxide, basic lead sulfate, tin oxide, carbon black, white lead, graphite, zinc sulfide, zinc oxide, chromic oxide, yellow nickel titanium, yellow chromium titanium, yellow iron oxide, red iron oxide, black iron oxide, azoic red and yellow pigment, chromium yellow, phthalocyanine green, phthalocyanine blue, ultramarine blue and quinacridone can be recited. These pigments may be used alone or in combination of two or more kinds.

As the solvent, for example, hydrocarbons such as toluene, xylene, ethylbenzene, cyclopentane, octane, heptane, cyclohexane and white spirit; ethers such as dioxane, tetrahydrofuran, ethylene glycol monomethyl ether, ethylene glycol monoethyl ether, ethylene glycol monobutyl ether, ethylene glycol dibutyl ether, diethylene glycol monomethyl ether and diethylene glycol monoethyl ether; esters such as butyl acetate, propyl acetate, benzyl acetate, ethylene glycol monomethyl ether acetate and ethylene glycol monoethyl ether acetate; ketones such as ethylisobutyl ketone and methylisobutyl ketone; alcohols such as n-butanol and propyl alcohol; and the like can be recited. These solvents may be used alone or in combination of two or more kinds.

The antifouling coating composition of the present invention may be prepared, for example, by adding, to the hydrolyzable resin (i) or a resin composition containing the same, the thermoplastic resin and/or plasticizer (ii), and optionally an antifouling agent, and other additives such as a pigment and a solvent as necessary, and mixing them by using a mixing machine such as a ball mill, a pebble mill, a roll mill, a sand grinding mill, or a high-speed disperser.

As described above, according to the antifouling coating composition of the present invention, since the hydrolyzable resin (i) itself serving as a vehicle exhibits excellent antifouling performance, it is possible to eliminate the antifouling agent that is separately blended, or to reduce the blending amount thereof. As a result, it is possible to achieve reduction in specific gravity of the antifouling coating composition (paint specific gravity). The reduced paint specific gravity allows reduction in weight of the antifouling coating composition required for forming a coating film of a certain volume, and this allows reduction in the number of paint cans required for applying a certain volume when the paint is sold by weight, and is advantageous in effective utilization of resources and improvement in transportation efficiency.

More concretely, while conventional mainstreams were antifouling coating compositions mainly containing a large amount of cuprous oxide as an antifouling agent, the paint specific gravity was as high as about 1.5 to 1.8 because the specific gravity of cuprous oxide was as high as about 5.9. According to the present invention, by not blending an antifouling agent having high specific gravity such as cuprous oxide, or reducing the blending amount thereof, it is possible to reduce the paint specific gravity to about 1.0 to 1.1. Assuming the dry film thickness of the coating film be 100 um, the theoretical application amount (kg) of a paint per 1 $m^2$ of application area is represented by the following formula:

$$\text{Theoretical application amount (kg)}=10\times\text{paint specific gravity/nonvolatile content volume ratio (\%)}$$

Here, the nonvolatile content volume ratio (%) means a solid content in terms of volume of the paint. According to the above formula, assuming the nonvolatile content volume ratio be 50%, the theoretical application amount of the paint having a paint specific gravity of 1.0 is 0.2 kg, and the theoretical application amount of the paint having a paint specific gravity of 1.6 is 0.32 kg. In this manner, according to the present invention, it is possible to reduce the use weight of the paint required for coating an object to be coated.

<Antifouling Film and Composite Film>

The antifouling film of the present invention can be formed by applying the antifouling coating composition on a surface of an object to be coated according to a routine method, and then removing a solvent by volatilization at room temperature or under heating as necessary. The application method is not particularly limited, and for example, conventionally known methods such as a dipping method, a spray method, brush application, a roller, electrostatic coating, and electrodeposition coating can be recited. Examples of the object to be coated include, but are not limited to, ships; fish nets typically for farming and other fishing equipment; harbor facilities; offences; intake equipment of an electric generation plant or the like; piping such as water conduits for cooling; bridges, buoyage; industrial water system facilities; and submarine bases. The antifouling film formed by using the antifouling coating composition of the present invention has an excellent long-term antifouling property and excellent crack resistance. Also adherence with a base is excellent. An application surface of the object to be coated may be pretreated as necessary, or on a primer film of another paint such as an antirust paint (anticorrosion paint) formed on an object to be coated, an antifouling film formed from the antifouling coating composition of the present invention may be formed to produce a composite film.

Here, as described above, according to the antifouling coating composition of the present invention, since the hydrolyzable resin (i) itself serving as a vehicle exhibits excellent antifouling performance, the antifouling agent that is separately blended can be eliminated, or the blending amount thereof can be reduced. Therefore, by the antifouling coating composition of the present invention, it is possible to form a clear (highly transparent) antifouling film. An antifouling film formed from a conventional antifouling coating composition mainly containing a large amount of cuprous oxide as an antifouling agent generally takes on a reddish color phase due to the contained cuprous oxide, and the color phase thereof is limited, however, according to the present invention, various applications utilizing the transparency of the obtained antifouling film are possible. In forming a clear antifouling film, it is preferred that the antifouling coating composition of the present invention does not contain a coloring pigment.

For example, in the composite film having a primer film formed from an antirust paint or the like and an antifouling film of the present invention formed on the primer film, by using a clear antifouling film as the antifouling film and those having various color phases as the antirust paint, it is possible to provide a coated object such as an in-water structure having a composite film-formed surface having a color phase that is not conventionally realized, while having an antifouling property. Also by forming an intermediate film of a paint having various color phases between the primer film of an antirust paint or the like and the clear antifouling film, it is possible to provide a coated object having a color phase that is not conventionally realized. As the paint forming the intermediate film, for example, various paints such as an antifouling paint, an epoxy resin paint, a urethane resin paint, an acrylic resin paint, a chlorinated rubber paint, an alkyd resin paint, a silicon resin paint, and a fluorine resin paint may be used. The antifouling paint forming the intermediate film may be the antifouling coating composition of the present invention, or a different antifouling coating composition such as a conventional antifouling coating composition containing a relatively large amount of antifouling agent. The intermediate film may be formed on the entire surface of the primer film, or may be formed on part of the surface. The intermediate film and the primer film may be a used old coating film. In this case, the antifouling film of the present invention may be used for repairing the old coating film.

Also by forming the intermediate film between the primer film of an antirust paint or the like and the clear antifouling film into the form of, for example, a character, pattern, design, or picture having various color phases, various design features can be imparted to the coated object. Also by interposing a film or a seal member in the form of a character, pattern, design, or picture having various color phases, in place of the intermediate film interposed between the primer film and the clear antifouling film, various design features can be imparted to the coated object.

EXAMPLES

In the following, the present invention will be described more specifically by way of examples and comparative examples, however, it is to be noted that the present invention will not be limited to these.

[1] Preparation of Metal-Atom-Containing Polymerizable Monomer (b)

Production Example M1: Preparation of Metal-Atom-Containing Polymerizable Monomer Mixture M1

A four-neck flask equipped with a condenser, a thermometer, a dropping funnel and a stirrer was charged with 85.4 parts by mass of PGM (propylene glycol methyl ether) and 40.7 parts by mass of zinc oxide, and the temperature was raised to 75° C. under stirring. Then, from the dropping funnel, a mixture of 43.1 parts by mass of methacrylic acid, 36.1 parts by mass of acrylic acid and 5 parts by mass of water was dropped at a constant velocity over 3 hours. After further stirring for 2 hours, 36 parts by mass of PGM was added, to obtain a transparent metal-atom-containing polymerizable monomer mixture M1. The solid content was 44.8% by mass. The metal-atom-containing polymerizable monomer mixture M1 contains zinc (meth)acrylate which is the monomer (b2) as the metal-atom-containing polymerizable monomer (b).

Production Example M2: Preparation of Metal-Atom-Containing Polymerizable Monomer Mixture M2

A four-neck flask equipped with a condenser, a thermometer, a dropping funnel and a stirrer was charged with 72.4 parts by mass of PGM and 40.7 parts by mass of zinc oxide, and the temperature was raised to 75° C. under stirring. Then, from the dropping funnel, a mixture of 30.1 parts by mass of methacrylic acid, 25.2 parts by mass of acrylic acid and 51.6 parts by mass of versatic acid was dropped at a constant velocity over 3 hours. After further stirring for 2 hours, 11 parts by mass of PGM was added, to obtain a transparent metal-atom-containing polymerizable monomer mixture M2. The solid content was 59.6% by mass. The metal-atom-containing polymerizable monomer mixture M2 contains, as the metal-atom-containing polymerizable monomer (b), zinc (meth)acrylate which is the monomer (b1) represented by the general formula (V') ($R^{30}$ is a versatic acid residue), and zinc (meth)acrylate which is the monomer (b2).

Production Example M3: Preparation of Metal-Atom-Containing Polymerizable Monomer Mixture M3

A four-neck flask equipped with a condenser, a thermometer, a dropping funnel and a stirrer was charged with 60 parts by mass of xylene, 13 parts by mass of PGM and 40.7 parts by mass of zinc oxide, and the temperature was raised to 75° C. under stirring. Then, from the dropping funnel, a mixture of 32.3 parts by mass of methacrylic acid, 27 parts by mass of acrylic acid, 37.7 parts by mass of oleic acid, 2.3 parts by mass of acetic acid and 5.8 parts by mass of propionic acid was dropped at a constant velocity over 3 hours. After further stirring for 2 hours, 77 parts by mass of xylene and 46 parts by mass of PGM were added, to obtain a transparent metal-atom-containing polymerizable monomer mixture M3. The solid content was 39.6% by mass. The metal-atom-containing polymerizable monomer mixture M3 contains, as the metal-atom-containing polymerizable monomer (b), zinc (meth)acrylate which is the monomer (b1) represented by the general formula (V') ($R^{30}$ is at least one kind of an oleic acid residue, an acetic acid residue, and a propionic acid residue) and zinc (meth)acrylate which is the monomer (b2).

[2] Preparation of Hydrolyzable Resin

Production Example S1: Preparation of Hydrolyzable Resin Composition S1

A four-neck flask equipped with a condenser, a thermometer, a dropping funnel and a stirrer was charged with 15 parts by mass of PGM, 65 parts by mass of xylene and 4 parts by mass of ethyl acrylate, and the temperature was raised to 100° C. under stirring. Then, from the dropping funnel, a mixture of 32.3 parts by mass of methyl methacrylate, 43.9 parts by mass of ethyl acrylate, 10 parts by mass of "FM-0721" (product of CHISSO CORPORATION), 21.7 parts by mass of the metal-atom-containing polymerizable monomer mixture M1 of Production Example M1, 10 parts by mass of xylene, 1.2 parts by mass of a chain transfer agent (α-methylstyrene dimer), 2.5 parts by mass of azobisisobutyronitrile (AIBN) and 3 parts by mass of azobismethylbutyronitrile (AMBN) was dropped at a constant velocity over 6 hours. After end of the dropping, 0.5 parts by mass of t-butylperoctoate and 10 parts by mass of xylene were dropped over 30 minutes, and after further stirring for 1 hour and 30 minutes, 10.1 parts by mass of xylene was added to obtain a hydrolyzable resin composition S1.

The obtained hydrolyzable resin composition S1 was analyzed by GPC ("HLC-8220GPC" available from TOSOH CORPORATION, eluent: dimethylformamide) and the weight average molecular weight of the hydrolyzable resin contained in the hydrolyzable resin composition S1 was 6800 in terms of polystyrene. The hydrolyzable resin isolated from the obtained hydrolyzable resin composition S1 by methanol reprecipitation was collected into a platinum crucible, added with sulfuric acid, and then heated in a pressurized decomposition vessel. After volatilizing sulfuric acid, the hydrolyzable resin was completely ashed. The ashed matter was subjected to alkaline fusion after left standing to cool, and analyzed by an ICP emission analyzer ("SPS5100" available from Seiko Instruments inc.) to find a Si atom. Also, the hydrolyzable resin was analyzed by an atomic absorption spectrophotometer ("AA6300" available from Shimadzu Corporation) to find a signal from a Zn atom.

Production Example S2: Preparation of Hydrolyzable Resin Composition S2

A four-neck flask equipped with a condenser, a thermometer, a dropping funnel and a stirrer was charged with 15 parts by mass of PGM, 65 parts by mass of xylene and 4 parts by mass of ethyl acrylate, and the temperature was raised to 100° C. under stirring. Then, from the dropping funnel, a mixture of 32.3 parts by mass of methyl methacrylate, 13.9 parts by mass of ethyl acrylate, 40 parts by mass of "FM-0711" (product of CHISSO CORPORATION), 21.7 parts by mass of the metal-atom-containing polymerizable monomer mixture M1 of Production Example M1, 10 parts by mass of xylene, 1.2 parts by mass of a chain transfer agent (α-methylstyrene dimer), 2.5 parts by mass of AIBN and 0.8 parts by mass of AMBN was dropped at a constant velocity over 6 hours. After end of the dropping, 0.5 parts by mass of t-butylperoctoate and 10 parts by mass of xylene were dropped over 30 minutes, and the mixture was further stirred for 1 hour and 30 minutes, and then added with 10.1 parts by mass of xylene, to obtain a hydrolyzable resin composition S2.

The obtained hydrolyzable resin composition S2 was analyzed by GPC ("HLC-8220GPC" available from TOSOH CORPORATION, eluent: dimethylformamide), and the weight average molecular weight of the hydrolyzable resin contained in the hydrolyzable resin composition S2 was 8800 in terms of polystyrene.

Production Example S3: Preparation of Hydrolyzable Resin Composition S3

A four-neck flask equipped with a condenser, a thermometer, a dropping funnel and a stirrer was charged with 15 parts by mass of PGM and 61 parts by mass of xylene, and the temperature was raised to 100° C. under stirring. Then, from the dropping funnel, a mixture of 18 parts by mass of methyl methacrylate, 25 parts by mass of ethyl acrylate, 40 parts by mass of "X-24-8201" (product of Shin-Etsu Chemical Co., Ltd.), 28.4 parts by mass of the metal-atom-containing polymerizable monomer mixture M2 of Production Example M2, 20 parts by mass of PGM, 2.5 parts by mass of AIBN and 1 part by mass of AMBN was dropped at a constant velocity over 4 hours. After end of the dropping, 0.5 parts by mass of t-butylperoctoate and 10 parts by mass of xylene were dropped over 30 minutes, and the mixture was further stirred for 1 hour and 30 minutes, and then added with 4.6 parts by mass of xylene, to obtain a hydrolyzable resin composition S3.

The obtained hydrolyzable resin composition S3 was analyzed by GPC ("HLC-8220GPC" available from TOSOH CORPORATION, eluent: dimethylformamide), and the weight average molecular weight of the hydrolyzable resin contained in the hydrolyzable resin composition S3 was 8200 in terms of polystyrene.

Production Example S4: Preparation of Hydrolyzable Resin Composition S4

A four-neck flask equipped with a condenser, a thermometer, a dropping funnel and a stirrer was charged with 35 parts by mass of PGM and 41 parts by mass of xylene, and the temperature was raised to 100° C. under stirring. Then, from the dropping funnel, a mixture of 18 parts by mass of methyl methacrylate, 15 parts by mass of ethyl acrylate, 50 parts by mass of "X-24-8201" (product of Shin-Etsu Chemical Co Ltd.), 42.5 parts by mass of the metal-atom-containing polymerizable monomer mixture M3 of Production Example M3, 5 parts by mass of PGM, 2.5 parts by mass of AIBN and 1 part by mass of AMBN was dropped at a constant velocity over 6 hours. After end of the dropping, 0.5 parts by mass of t-butylperoctoate and 10 parts by mass of xylene were dropped over 30 minutes, and the mixture was further stirred for 1 hour and 30 minutes, and then added with 5.5 parts by mass of xylene, to obtain a hydrolyzable resin composition S4.

The obtained hydrolyzable resin composition S4 was analyzed by GPC ("HLC-8220GPC" available from TOSOH CORPORATION, eluent: dimethylformamide), and the weight average molecular weight of the hydrolyzable resin contained in the hydrolyzable resin composition S4 was 7200 in terms of polystyrene.

Production Example S5: Preparation of Hydrolyzable Resin Composition S5

A four-neck flask equipped with a condenser, a thermometer, a dropping funnel and a stirrer was charged with 15 parts by mass of PGM, 59 parts by mass of xylene and 4 parts by mass of ethyl acrylate, and the temperature was raised to 100° C. under stirring. Then, from the dropping funnel, a mixture of 26.4 parts by mass of methyl methacrylate, 25.5 parts by mass of ethyl acrylate, 30 parts by mass of a silicon-containing monomer A, 31.3 parts by mass of the metal-atom-containing polymerizable monomer mixture M1 of Production Example M1, 10 parts by mass of xylene, 1.5 parts by mass of a chain transfer agent (α-methylstyrene dimer), 2.5 parts by mass of AIBN and 4 parts by mass of AMBN was dropped at a constant velocity over 6 hours. After end of the dropping, 0.5 parts by mass of t-butylperoctoate and 10 parts by mass of xylene were dropped over 30 minutes, and the mixture was further stirred for 1 hour and 30 minutes, and then added with 10.8 parts by mass of xylene, to obtain a hydrolyzable resin composition S5.

The obtained hydrolyzable resin composition S5 was analyzed by GPC ("HLC-8220GPC" available from TOSOH CORPORATION, eluent: dimethylformamide), and the weight average molecular weight of the hydrolyzable resin contained in the hydrolyzable resin composition S5 was 6400 in terms of polystyrene.

Production Example S6: Preparation of Hydrolyzable Resin Composition S6

A four-neck flask equipped with a condenser, a thermometer, a dropping funnel and a stirrer was charged with 15 parts by mass of PGM, 59 parts by mass of xylene and 4 parts by mass of ethyl acrylate, and the temperature was raised to 100° C. under stirring. Then, from the dropping funnel, a mixture of 21.4 parts by mass of methyl methacrylate, 25.5 parts by mass of ethyl acrylate, 5 parts by mass of styrene, 30 parts by mass of a silicon-containing monomer B, 31.3 parts by mass of the metal-atom-containing polymerizable monomer mixture M1 of Production Example M1, 10 parts by mass of xylene, 1.5 parts by mass of a chain transfer agent (α-methylstyrene dimer), 2.5 parts by mass of AIBN and 2.5 parts by mass of AMBN was dropped at a constant velocity over 6 hours. After end of the dropping, 0.5 parts by mass of t-butylperoctoate and 10 parts by mass of xylene were dropped over 30 minutes, and the mixture was further stirred for 1 hour and 30 minutes, and then added with 10.8 parts by mass of xylene, to obtain a hydrolyzable resin composition S6.

The obtained hydrolyzable resin composition S6 was analyzed by GPC ("HLC-8220GPC" available from TOSOH CORPORATION, eluent: dimethylformamide), and the weight average molecular weight of the hydrolyzable resin contained in the hydrolyzable resin composition S6 was 6900 in terms of polystyrene.

Production Example S7: Preparation of Hydrolyzable Resin Composition S7

A four-neck flask equipped with a condenser, a thermometer, a dropping funnel and a stirrer was charged with 15 parts by mass of PGM, 59 parts by mass of xylene and 4 parts by mass of ethyl acrylate, and the temperature was raised to 100° C. under stirring. Then, from the dropping funnel, a mixture of 26.4 parts by mass of methyl methacrylate, 14.5 parts by mass of ethyl acrylate, 5 parts by mass of 2-methoxyethyl acrylate, 20 parts by mass of "FM-0711" (product of CHISSO CORPORATION), 20 parts by mass of "TM-0701" (product of CHISSO CORPORATION), 31.3 parts by mass of the metal-atom-containing polymerizable monomer mixture M1 of Production Example M1, 10 parts by mass of xylene, 1.5 parts by mass of a chain transfer agent (α-methylstyrene dimer), 2.5 parts by mass of AIBN and 2.5 parts by mass of AMBN was dropped at a constant velocity over 6 hours. After end of the dropping, 0.5 parts by mass of t-butylperoctoate and 10 parts by mass of xylene were dropped over 30 minutes, and the mixture was further stirred for 1 hour and 30 minutes, and then added with 10.8 parts by mass of xylene, to obtain a hydrolyzable resin composition S7.

The obtained hydrolyzable resin composition S7 was analyzed by GPC ("HLC-8220GPC" available from TOSOH CORPORATION, eluent: dimethylformamide), and the weight average molecular weight of the hydrolyzable resin contained in the hydrolyzable resin composition S7 was 7000 in terms of polystyrene.

Production Example S8: Preparation of Hydrolyzable Resin Composition S8

A four-neck flask equipped with a condenser, a thermometer, a dropping funnel and a stirrer was charged with 15 parts by mass of PGM and 61 parts by mass of xylene, and the temperature was raised to 100° C. under stirring. Then, from the dropping funnel, a mixture of 18 parts by mass of methyl methacrylate, 35 parts by mass of ethyl acrylate, 30 parts by mass of a silicon-containing, monomer C, 28.4 parts by mass of the metal-atom-containing polymerizable monomer mixture M2 of Production Example M2, 20 parts by mass of PGM, 2.5 parts by mass of AIBN and 2 parts by mass of AMBN was dropped at a constant velocity over 4 hours. After end of the dropping, 0.5 parts by mass of t-butylperoctoate and 10 parts by mass of xylene were dropped over 30 minutes, and the mixture was further stirred for 1 hour and 30 minutes, and then added with 4.6 parts by mass of xylene, to obtain a hydrolyzable resin composition S8.

The obtained hydrolyzable resin composition S8 was analyzed by GPC ("HLC-8220GPC" available from TOSOH CORPORATION, eluent: dimethylformamide), and the weight average molecular weight of the hydrolyzable resin contained in the hydrolyzable resin composition S8 was 7700 in terms of polystyrene.

Production Example S9: Preparation of Hydrolyzable Resin Composition S9

A four-neck flask equipped with a condenser, a thermometer, a dropping funnel and a stirrer was charged with 15 parts by mass of PGM, 59 parts by mass of xylene and 4 parts by mass of ethyl acrylate, and the temperature was raised to 100° C. under stirring. Then, from the dropping funnel, a mixture of 26.4 parts by mass of methyl methacrylate, 35.5 parts by mass of ethyl acrylate, 20 parts by mass of a silicon-containing monomer D, 31.3 parts by mass of the metal-atom-containing polymerizable monomer mixture M1 of Production Example M1, 10 parts by mass of xylene, 1.5 parts by mass of a chain transfer agent (α-methylstyrene dimer), 2.5 parts by mass of AIBN and 5.5 parts by mass of AMBN was dropped at a constant velocity over 6 hours. After end of the dropping, 0.5 parts by mass of t-butylperoctoate and 10 parts by mass of xylene were dropped over 30 minutes, and the mixture was further stirred for 1 hour and 30 minutes, and then added with 10.8 parts by mass of xylene, to obtain a hydrolyzable resin composition S9.

The obtained hydrolyzable resin composition S9 was analyzed by GPC ("HLC-8220GPC" available from TOSOH CORPORATION, eluent: dimethylformamide), and the weight average molecular weight of the hydrolyzable resin contained in the hydrolyzable resin composition S9 was 6000 in terms of polystyrene.

Production Example S10: Preparation of Hydrolyzable Resin Composition S10

A four-neck flask equipped with a condenser, a thermometer, a dropping funnel and a stirrer was charged with 15 parts by mass of PGM, 65 parts by mass of xylene and 4 parts by mass of ethyl acrylate, and the temperature was raised to 100° C. under stirring. Then, from the dropping funnel, a mixture of 32.3 parts by mass of methyl methacrylate, 43.9 parts by mass of ethyl acrylate, 10 parts by mass of "FM-7711" (product of CHISSO CORPORATION), 21.7 parts by mass of the metal-atom-containing polymerizable monomer mixture M1 of Production Example M1, 10 parts by mass of xylene, 2 parts by mass of a chain transfer agent (α-methylstyrene dimer), 2.5 parts by mass of AIBN and 7.5 parts by mass of AMBN was dropped at a constant velocity over 6 hours. After end of the dropping, 0.5 parts by mass of t-butylperoctoate and 10 parts by mass of xylene were dropped over 30 minutes, and the mixture was further stirred for 1 hour and 30 minutes, and then added with 10.1 parts by mass of xylene, to obtain a hydrolyzable resin composition S10.

The obtained hydrolyzable resin composition S10 was analyzed by GPC ("HLC-8220GPC" available from TOSOH CORPORATION, eluent: dimethylformamide), and the weight average molecular weight of the hydrolyzable resin contained in the hydrolyzable resin composition S10 was 5400 in terms of polystyrene. The hydrolyzable resin isolated from the obtained hydrolyzable resin composition S10 by methanol reprecipitation was collected into a platinum crucible, added with sulfuric acid, and then heated in a pressurized decomposition vessel. After volatilizing sulfuric acid, the hydrolyzable resin was completely ashed. The ashed matter was subjected to alkaline fusion after left standing to cool, and analyzed by an ICP emission analyzer ("SPS5100" available from Seiko Instruments inc.) to find a Si atom. Also, the hydrolyzable resin was analyzed by an atomic absorption spectrophotometer ("AA6300" available from Shimadzu Corporation) to find a signal from a Zn atom.

Production Example S11: Preparation of Hydrolyzable Resin Composition S11

A four-neck flask equipped with a condenser, a thermometer, a dropping funnel and a stirrer was charged with 15 parts by mass of PGM, 65 parts by mass of xylene and 4 parts by mass of ethyl acrylate, and the temperature was raised to 100° C. under stirring. Then, from the dropping funnel, a mixture of 32.3 parts by mass of methyl methacrylate, 33.9 parts by mass of ethyl acrylate, 20 parts by mass of "FM-7721" (product of CHISSO CORPORATION), 21.7 parts by mass of the metal-atom-containing polymerizable monomer mixture M1 of Production Example M1, 10 parts by mass of xylene, 1.5 parts by mass of a chain transfer agent (α-methylstyrene dimer), 2.5 parts by mass of AIBN and 5 parts by mass of AMBN was dropped at a constant velocity over 6 hours. After end of the dropping, 0.5 parts by mass of t-butyl peroctoate and 10 parts by mass of xylene were dropped over 30 minutes, and the mixture was further stirred for 1 hour and 30 minutes, and then added with 10.1 parts by mass of xylene, to obtain a hydrolyzable resin composition S11.

The obtained hydrolyzable resin composition S11 was analyzed by GPC ("HLC-8220GPC" available from TOSOH CORPORATION, eluent: dimethylformamide), and the weight average molecular weight of the hydrolyzable resin contained in the hydrolyzable resin composition S11 was 6200 in terms of polystyrene.

Production Example S12: Preparation of Hydrolyzable Resin Composition S12

A four-neck flask equipped with a condenser, a thermometer, a dropping funnel and a stirrer was charged with 15 parts by mass of PGM, 59 parts by mass of xylene and 4 parts by mass of ethyl acrylate, and the temperature was raised to 100° C. under stirring. Then, from the dropping funnel, a mixture of 26.4 parts by mass of methyl methacrylate, 40.5 parts by mass of ethyl acrylate, 15 parts by mass of a silicon-containing monomer E, 31.3 parts by mass of the metal-atom-containing polymerizable monomer mixture M1 of Production Example M1, 10 parts by mass of xylene, 2 parts by mass of a chain transfer agent (α-methylstyrene dimer), 2.5 parts by mass of AIBN and 8 parts by mass of AMBN was dropped at a constant velocity over 6 hours. After end of the dropping, 0.5 parts by mass of t-butylperoctoate and 10 parts by mass of xylene were dropped over 30 minutes, and the mixture was further stirred for 1 hour and 30 minutes, and then added with 10.8 parts by mass of xylene, to obtain a hydrolyzable resin composition S12.

The obtained hydrolyzable resin composition S12 was analyzed by GPC ("HLC-8220GPC" available from TOSOH CORPORATION, eluent: dimethylformamide), and the weight average molecular weight of the hydrolyzable resin contained in the hydrolyzable resin composition S12 was 5600 in terms of polystyrene.

Production Example S13: Preparation of Hydrolyzable Resin Composition S13

A four-neck flask equipped with a condenser, a thermometer, a dropping funnel and a stirrer was charged with 15 parts by mass of PGM, 59 parts by mass of xylene and 4 parts by mass of ethyl acrylate, and the temperature was raised to 100° C. under stirring. Then, from the dropping funnel, a mixture of 26.4 parts by mass of methyl methacrylate, 35.5 parts by mass of ethyl acrylate, 20 parts by mass of a silicon-containing monomer F, 31.3 parts by mass of the metal-atom-containing polymerizable monomer mixture M1 of Production Example M1, 10 parts by mass of xylene, 1.5 parts by mass of a chain transfer agent (α-methylstyrene dimer), 2.5 parts by mass of AIBN and 7.5 parts by mass of AMBN was dropped at a constant velocity over 6 hours. After end of the dropping, 0.5 parts by mass of t-butylperoctoate and 10 parts by mass of xylene were dropped over 30 minutes, and the mixture was further stirred for 1 hour and 30 minutes, and then added with 10.8 parts by mass of xylene, to obtain a hydrolyzable resin composition S13.

The obtained hydrolyzable resin composition S13 was analyzed by GPC ("HLC-8220GPC" available from TOSOH CORPORATION, eluent: dimethylformamide), and the weight average molecular weight of the hydrolyzable resin contained in the hydrolyzable resin composition S13 was 5500 in terms of polystyrene.

Production Example S14: Preparation of Hydrolyzable Resin Composition S14

A four-neck flask equipped with a condenser, a thermometer, a dropping funnel and a stirrer was charged with 15 parts by mass of PGM, 65 parts by mass of xylene and 4 parts by mass of ethyl acrylate, and the temperature was raised to 100° C. under stirring. Then, from the dropping funnel, a mixture of 32.3 parts by mass of methyl methacrylate, 13.9 parts by mass of ethyl acrylate, 5 parts by mass of "FM 7711" (product of CHISSO CORPORATION), 35 parts by mass of "FM-0711" (product of CHISSO CORPORATION), 21.7 parts by mass of the metal-atom-containing polymerizable monomer mixture M1 of Production Example M1, 10 parts by mass of xylene, 1.2 parts by mass of a chain transfer agent (α-methylstyrene dimer), 2.5 parts by mass of AIBN and 4 parts by mass of AMBN was dropped at a constant velocity over 6 hours. After end of the dropping, 0.5 parts by mass of t-butylperoctoate and 10 parts by mass of xylene were dropped over 30 minutes, and the mixture was further stirred for 1 hour and 30 minutes, and then added with 10.1 parts by mass of xylene, to obtain a hydrolyzable resin composition S14.

The obtained hydrolyzable resin composition S14 was analyzed by GPC ("HLC-8220GPC" available from TOSOH CORPORATION, eluent: dimethylformamide), and the weight average molecular weight of the hydrolyzable resin contained in the hydrolyzable resin composition S14 was 9000 in terms of polystyrene.

Production Example S15: Preparation of Hydrolyzable Resin Composition S15

A four-neck flask equipped with a condenser, a thermometer, a dropping funnel and a stirrer was charged with 35 parts by mass of PGM and 31 parts by mass of xylene, and the temperature was raised to 100° C. under stirring. Then, from the dropping funnel, a mixture of 18 parts by mass of methyl methacrylate, 25 parts by mass of ethyl acrylate, 10 parts by mass of "FM-7721" (product of CHISSO CORPORATION), 30 parts by mass of "X-24-8201" (product of Shin-Etsu Chemical Co., Ltd.), 28.4 parts by mass of the metal-atom-containing polymerizable monomer mixture M2 of Production Example M2, 30 parts by mass of xylene, 2.5 parts by mass of AIBN and 2.5 parts by mass of AMBN was dropped at a constant velocity over 4 hours. After end of the dropping, 0.5 parts by mass of t-butylperoctoate and 10 parts by mass of xylene were dropped over 30 minutes, and the mixture was further stirred for 1 hour and 30 minutes, and then added with 4.6 parts by mass of xylene, to obtain a hydrolyzable resin composition S15.

The obtained hydrolyzable resin composition S15 was analyzed by GPC ("HLC-8220GPC" available from TOSOH CORPORATION, eluent: dimethylformamide), and the weight average molecular weight of the hydrolyzable resin contained in the hydrolyzable resin composition S15 was 7200 in terms of polystyrene.

Production Example S16: Preparation of Hydrolyzable Resin Composition S16

A four-neck flask equipped with a condenser, a thermometer, a dropping funnel and a stirrer was charged with 40 parts by mass of PGM and 31 parts by mass of xylene, and the temperature was raised to 100° C. under stirring. Then, from the dropping funnel, a mixture of 18 parts by mass of methyl methacrylate, 15 parts by mass of ethyl acrylate, 10 parts by mass of "FM-7711" (product of CHISSO CORPORATION), 10 parts by mass of "FM-7721" (product of CHISSO CORPORATION), 30 parts by mass of "FM-0711" (product of CHISSO CORPORATION), 42.5 parts by mass of the metal-atom-containing polymerizable monomer mixture M3 of Production Example M3, 10 parts by mass of xylene, 2.5 parts by mass of AIBN and 4.5 parts by mass of AMBN was dropped at a constant velocity over 6 hours. After end of the dropping, 0.5 parts by mass of t-butylperoctoate and 10 parts by mass of xylene were dropped over 30 minutes, and the mixture was further stirred for 1 hour and 30 minutes, and then added with 5.5 parts by mass of xylene, to obtain a hydrolyzable resin composition S16.

The obtained hydrolyzable resin composition S16 was analyzed by GPC ("HLC-8220GPC" available from TOSOH CORPORATION, eluent: dimethylformamide), and the weight average molecular weight of the hydrolyzable resin contained in the hydrolyzable resin composition S16 was 6400 in terms of polystyrene.

Production Example S17: Preparation of Hydrolyzable Resin Composition S17

A four-neck flask equipped with a condenser, a thermometer, a dropping funnel and a stirrer was charged with 15 parts by mass of PGM, 59 parts by mass of xylene and 4 parts by mass of ethyl acrylate, and the temperature was raised to 100° C. under stirring. Then, from the dropping funnel, a mixture of 26.4 parts by mass of methyl methacrylate, 15.5 parts by mass of ethyl acrylate, 2 parts by mass of a silicon-containing monomer G, 38 parts by mass of the silicon-containing monomer D, 31.3 parts by mass of the metal-atom-containing polymerizable monomer mixture M1 of Production Example M1, 10 parts by mass of xylene, 1.2 parts by mass of a chain transfer agent (α-methylstyrene dimer), 2.5 parts by mass of AIBN and 5.5 parts by mass of AMBN was dropped at a constant velocity over 6 hours. After end of the dropping, 0.5 parts by mass of t-butylperoctoate and 10 parts by mass of xylene were dropped over 30 minutes, and the mixture was further stirred for 1 hour and 30 minutes, and then added with 10.8 parts by mass of xylene, to obtain a hydrolyzable resin composition S17.

The obtained hydrolyzable resin composition S17 was analyzed by GPC ("HLC-8220GPC" available from TOSOH CORPORATION, eluent: dimethylformamide), and the weight average molecular weight of the hydrolyzable resin contained in the hydrolyzable resin composition S17 was 5600 in terms of polystyrene.

Production Example S18: Preparation of Hydrolyzable Resin Composition S18

A four-neck flask equipped with a condenser, a thermometer, a dropping funnel and a stirrer was charged with 35 parts by mass of PGM and 31 parts by mass of xylene, and the temperature was raised to 100° C. under stirring. Then, from the dropping funnel, a mixture of 18 parts by mass of methyl methacrylate, 45 parts by mass of ethyl acrylate, 10 parts by mass of the silicon-containing monomer G, 10 parts by mass of "TM-0701" (product of CHISSO CORPORATION), 28.4 parts by mass of the metal-atom-containing polymerizable monomer mixture M2 of Production Example M2, 30 parts by mass of xylene, 2.5 parts by mass of AIBN and 5 parts by mass of AMBN was dropped at a constant velocity over 4 hours. After end of the dropping, 0.5 parts by mass of t-butylperoctoate and 10 parts by mass of xylene were dropped over 30 minutes, and the mixture was further stirred for 1 hour and 30 minutes, and then added with 4.6 parts by mass of xylene, to obtain a hydrolyzable resin composition S18.

The obtained hydrolyzable resin composition S18 was analyzed by GPC ("HLC-8220GPC" available from TOSOH CORPORATION, eluent: dimethylformamide), and the weight average molecular weight of the hydrolyzable resin contained in the hydrolyzable resin composition S18 was 6000 in terms of polystyrene.

Production Example T1: Preparation of Resin Composition T1

A four-neck flask equipped with a condenser, a thermometer, a dropping funnel and a stirrer was charged with 15 parts by mass of PGM and 65 parts by mass of xylene, and the temperature was raised to 100° C. under stirring. Then, from the dropping funnel, a mixture of 42.1 parts by mass of methyl methacrylate, 37.9 parts by mass of ethyl acrylate, 20 parts by mass of "FM-0711" (product of CHISSO CORPORATION), 10 parts by mass of xylene, 11.9 parts by mass of PGM, 1.2 parts by mass of a chain transfer agent (α-methylstyrene dimer), 2.5 parts by mass of AIBN and 2 parts by mass of AMBN was dropped at a constant velocity over 6 hours. After end of the dropping, 0.5 parts by mass of t-butylperoctoate and 10 parts by mass of xylene were dropped over 30 minutes, and the mixture was further stirred for 1 hour and 30 minutes, and then added with 10.1 parts by mass of xylene, to obtain a resin composition T1.

The obtained resin composition T1 was analyzed by GPC ("HLC-8220GPC" available from TOSOH CORPORATION, eluent: dimethylformamide), and the weight average molecular weight of the resin contained in the resin composition T1 was 6200 in terms of polystyrene.

Production Example T2: Preparation of Resin Composition T2

A four-neck flask equipped with a condenser, a thermometer, a dropping funnel and a stirrer was charged with 15 parts by mass of PGM and 70 parts by mass of xylene, and the temperature was raised to 100° C. under stirring. Then, from the dropping funnel, a mixture of 42.1 parts by mass of methyl methacrylate, 17.9 parts by mass of ethyl acrylate, 10 parts by mass of "FM-7711" (product of CHISSO CORPORATION), 30 parts by mass of "FM-0711" (product of CHISSO CORPORATION), 10 parts by mass of xylene, 11.9 parts by mass of PGM, 3 parts by mass of a chain transfer agent (α-methylstyrene dimer), 2.5 parts by mass of AIBN and 7 parts by mass of AMBN was dropped at a constant velocity over 6 hours. After end of the dropping, 0.5 parts by mass of t-butylperoctoate and 10 parts by mass of xylene were dropped over 30 minutes, and the mixture was further stirred for 1 hour and 30 minutes, and then added with 5.1 parts by mass of xylene, to obtain a resin composition T2.

The obtained resin composition T2 was analyzed by GPC ("HLC-8220GPC" available from TOSOH CORPORATION, eluent: dimethylformamide), and the weight average molecular weight of the resin contained in the resin composition T2 was 8600 in terms of polystyrene.

Production Example T3: Preparation of Hydrolyzable Resin Composition T3

A four-neck flask equipped with a stirrer, a condenser, a temperature control device, a nitrogen introducing tube, and a dropping funnel was charged with 64 parts by mass of xylene and 16 parts by mass of n-butanol, and kept at 100° C. The solution was added dropwise with a mixed liquid of a monomer according to the formulation (part by mass) of Table 2 and 2.3 parts by mass of t-butylperoxy-2-ethylhexanoate at a constant velocity over 3 hours, and retained at this temperature for 30 minutes after end of the dropping. Then, a mixed liquid of 16 parts by mass of xylene, 4 parts by mass of n-butanol and 0.2 parts by mass of t-butylperoxy-2-ethylhexanoate was added dropwise at a constant velocity over 30 minutes, and retained at this temperature for 1 hour and 30 minutes after end of the dropping, to obtain a resin varnish. The solid content in the obtained resin varnish was 49.8% by mass, and the acid value of the resin in the resin varnish was 130.

Next, in a similar reaction vessel, 100 parts by mass of the resin varnish, 25.4 parts by mass of zinc acetate, 39.2 parts by mass of naphthenic acid (NA-165, acid value 165 mg KOH/g, product of Yamato Yushi Kogyo), and 110 parts by mass of xylene were added, and heated to 130° C., and acetic acid was removed together with the solvent, to obtain a hydrolyzable resin composition T3 having a solid content of 41.5% by mass.

The obtained hydrolyzable resin composition T3 was analyzed by GPC ("HLC-8220GPC" available from TOSOH CORPORATION, eluent: dimethylformamide), and the weight average molecular weight of the hydrolyzable resin contained in the hydrolyzable resin composition T3 was 8000 in terms of polystyrene.

Production Example T4: Preparation of Hydrolyzable Resin Composition T4

A four-neck flask equipped with a stirrer, a condenser, a temperature control device, a nitrogen introducing tube, and a dropping funnel was charged with 64 parts by mass of xylene and 16 parts by mass of n-butanol, and kept at 115° C. The solution was added dropwise with a mixed liquid of a monomer according to the formulation (part by mass) of Table 2 and 3 parts by mass of t-butylperoxy-2-ethylhexanoate at a constant velocity over 3 hours, and retained at this temperature for 30 minutes after end of the dropping. Then, a mixed liquid of 16 parts by mass of xylene, 4 parts by mass of n-butanol and 0.2 parts by mass of t-butylperoxy-2-ethylhexanoate was added dropwise at a constant velocity over 30 minutes, and retained at this temperature for 1 hour and 30 minutes after end of the dropping, to obtain a resin varnish. The solid content in the obtained resin varnish was 49.7% by mass, and the acid value of the resin in the resin varnish was 160.

Next, in a similar reaction vessel, a reaction was conducted in a similar manner as in Production Example T3 except that 100 parts by mass of the resin varnish, 29.6 parts by mass of copper acetate, and 14.5 parts by mass of pivalic acid (acid value: 550 mgKOH/g) were used, to obtain a hydrolyzable resin composition T4 having a solid content of 45.2% by mass.

The obtained hydrolyzable resin composition T4 was analyzed by GPC ("HLC-8220GPC" available from TOSOH CORPORATION, eluent: dimethylformamide), and the weight average molecular weight of the hydrolyzable resin contained in the hydrolyzable resin composition T4 was 6500 in terms of polystyrene.

Table 1 and Table 2 show the charged amount (part by mass) of each material used for preparation of a hydrolyzable resin composition or a resin composition in Production Examples S1 to S18 and T1 to T4, Gardner viscosity (measured at 25° C. using a Gardner bubble viscometer) and solid content (% by mass) of the obtained hydrolyzable resin composition or resin composition, and the weight average molecular weight of the hydrolyzable resin or resin contained in the composition.

TABLE 1

| | | | | Production example | | | | | | | | | |
|---|---|---|---|---|---|---|---|---|---|---|---|---|---|
| | | | | S1 | S2 | S3 | S4 | S5 | S6 | S7 | S8 | S9 | T1 |
| Charged amount (part by mass) | (a) | (a1) | FM-0711 | | 40 | | | | | | 20 | | 20 |
| | | | FM-0721 | 10 | | | | | | | | | |
| | | | X-24-8201 | | | | 40 | 50 | | | | | |
| | | | Silicon-containing monomer A | | | | | | 30 | | | | |
| | | | Silicon-containing monomer B | | | | | | | 30 | | | |
| | | (a2) | TM-0701 | | | | | | | | 20 | | |
| | | | Silicon-containing monomer C | | | | | | | | | 30 | |
| | | | Silicon-containing monomer D | | | | | | | | | 20 | |
| | (b)Metal-atom-containing monomer mixture | | M1 | 21.7 | 21.7 | | | 31.3 | 31.3 | 31.3 | | 31.3 | |
| | | | M2 | | | 28.4 | | | | | 28.4 | | |
| | | | M3 | | | | 42.5 | | | | | | |
| | (c) | | MMA | 32.3 | 32.3 | 18 | 18 | 26.4 | 21.4 | 26.4 | 18 | 26.4 | 42.1 |
| | | | EA | 43.9 | 17.9 | 25 | 15 | 29.5 | 29.5 | 18.5 | 35 | 39.5 | 37.9 |
| | | | 2-MTA | | | | | | | 5 | | | |
| | | | ST | | | | | | 5 | | | | |
| Initiator | | | AIBN | 2.5 | 2.5 | 2.5 | 2.5 | 2.5 | 2.5 | 2.5 | 2.5 | 2.5 | 2.5 |
| | | | AMBN | 3 | 0.8 | 1 | 1 | 4 | 2.5 | 2.5 | 2 | 5.5 | 2 |
| Chain transfer agent | | | α-methylstyrene dimer | 1.2 | 1.2 | | | 1.5 | 1.5 | 1.5 | | 1.5 | 1.2 |
| Gardner viscosity | | | | −U | +U | +U | +R | −W | −T | −V | +T | +W | +E |
| Solid content (% by mass) | | | | 45.7 | 45.1 | 45.2 | 45.0 | 45.8 | 45.3 | 45.6 | 45.3 | 45.6 | 44.8 |
| Weight average molecular weight | | | | 6800 | 8800 | 8200 | 7200 | 6400 | 6900 | 7000 | 7700 | 6000 | 6200 |

TABLE 2

| | | | | Production example | | | | | | |
|---|---|---|---|---|---|---|---|---|---|---|
| | | | | S10 | S11 | S12 | S13 | S14 | S15 | S16 |
| Charged amount (part by mass) | (a) | (a1) | FM-0711 | | | | | | 35 | 30 |
| | | | X-24-8201 | | | | | | 30 | |
| | | (a2) | TM-0701 | | | | | | | |
| | | | Silicon-containing monomer D | | | | | | | |
| | | (a3) | FM-7711 | 10 | | | | 5 | | 10 |
| | | | FM-7721 | | 20 | | | | 10 | 10 |
| | | | Silicon-containing monomer E | | | 15 | | | | |
| | | (a4) | Silicon-containing monomer F | | | | 20 | | | |
| | | | Silicon-containing monomer G | | | | | | | |

TABLE 2-continued

| | | | | | | | | | |
|---|---|---|---|---|---|---|---|---|---|
| (b)Metal-atom-containing monomer mixture | M1 | | 21.7 | 21.7 | 31.3 | 31.3 | 21.7 | | |
| | M2 | | | | | | | 28.4 | |
| | M3 | | | | | | | | 42.5 |
| (c) | MMA | | 32.3 | 32.3 | 26.4 | 26.4 | 32.3 | 18 | 18 |
| | EA | | 47.9 | 37.9 | 44.5 | 39.5 | 17.9 | 25 | 15 |
| | 2-MTA | | | | | | | | |
| | ST | | | | | | | | |
| | CHMA | | | | | | | | |
| | CHA | | | | | | | | |
| | M-90G | | | | | | | | |
| | AA | | | | | | | | |
| | MAA | | | | | | | | |
| Initiator | Kayaester O | | | | | | | | |
| | AIBN | | 2.5 | 2.5 | 2.5 | 2.5 | 2.5 | 2.5 | 2.5 |
| | AMBN | | 7.5 | 5 | 8 | 7.5 | 4 | 2.5 | 4.5 |
| Chain transfer agent | α-methylstyrene dimer | | 2 | 1.5 | 2 | 1.5 | 1.2 | | |
| Gardner viscosity | | | +W | +U | +R | −W | +V | −V | −T |
| Solid content (% by mass) | | | 46.2 | 46.1 | 46.4 | 45.8 | 45.6 | 45.4 | 45.6 |
| Weight average molecular weight | | | 5400 | 6200 | 5600 | 5500 | 9000 | 7200 | 6400 |

| | | | | Production example | | | | |
|---|---|---|---|---|---|---|---|---|
| | | | | S17 | S18 | T2 | T3 | T4 |
| Charged amount (part by mass) | (a) | (a1) | FM-0711 | | | | 30 | |
| | | | X-24-8201 | | | | | |
| | | (a2) | TM-0701 | | 10 | | | |
| | | | Silicon-containing monomer D | 38 | | | | |
| | | (a3) | FM-7711 | | | | 10 | |
| | | | FM-7721 | | | | | |
| | | | Silicon-containing monomer E | | | | | |
| | | (a4) | Silicon-containing monomer F | | | | | |
| | | | Silicon-containing monomer G | 2 | 10 | | | |
| | (b)Metal-atom-containing monomer mixture | | M1 | 31.3 | | | | |
| | | | M2 | | 28.4 | | | |
| | | | M3 | | | | | |
| | (c) | | MMA | 26.4 | 18 | 42.1 | | 11.17 |
| | | | EA | 19.5 | 45 | 17.9 | 58.3 | 16.3 |
| | | | 2-MTA | | | | | |
| | | | ST | | | | | |
| | | | CHMA | | | | 15 | 15 |
| | | | CHA | | | | | 15 |
| | | | M-90G | | | | 10 | 30 |
| | | | AA | | | | 16.7 | 10.27 |
| | | | MAA | | | | | 12.26 |
| Initiator | | | Kayaester O | | | | 2.5 | 3.2 |
| | | | AIBN | 2.5 | 2.5 | 2.5 | | |
| | | | AMBN | 5.5 | 5 | 7 | | |
| Chain transfer agent | | | α-methylstyrene dimer | 1.2 | | 3 | | |
| Gardner viscosity | | | | −T | +W | +E | W-X | Z2-Z3 |
| Solid content (% by mass) | | | | 45.6 | 45.6 | 45.5 | 41.5 | 45.2 |
| Weight average molecular weight | | | | 5600 | 6000 | 8600 | 8000 | 6500 |

Trade names and abbreviations shown in Table 1 and Table 2 are as follows.

(1) FM-0711 (trade name, product of CHISSO CORPORATION): Silicon-containing polymerizable monomer wherein m=0, b=3, n=10, and $R^1$ to $R^5$ and $R^{31}$ are methyl groups in the general formula (I').

(2) FM-0721 (trade name, product of CHISSO CORPORATION): Silicon-containing polymerizable monomer wherein m=0, b=3, n=65, and $R^1$ to $R^5$ and $R^{31}$ are methyl groups in the general formula (I').

(3) X-24-8201 (trade name, product of Shin-Etsu Chemical Co., Ltd.): Silicon-containing polymerizable monomer wherein m=0, b=3, n=25, and $R^1$ to $R^5$ and $R^{31}$ are methyl groups in the general formula (I').

(4) Silicon-containing monomer A: Silicon-containing polymerizable monomer wherein m=10, b=3, n=10, and $R^1$ to $R^5$ and $R^{31}$ are methyl groups in the general formula (I') which is a 1:1 (molar ratio) mixture of those wherein a is 2 and 3. (This monomer was sold by Nippon Unicar Company Limited under the trade name "F2-254-04".)

(5) Silicon-containing monomer B: Silicon-containing polymerizable monomer wherein m=4, b=3, n=10, and $R^1$ to $R^5$ and $R^{31}$ are methyl groups in the general formula (I'), which is a 1:1 (molar ratio) mixture of those wherein a is 2 and 3. (This monomer was sold by Nippon Unicar Company Limited under the trade name "F2-254-14".)

(6) TM-0701 (trade name, product of CHISSO CORPORATION): Silicon-containing polymerizable monomer wherein p=0, d=3, and $R^6$ to $R^8$ and $R^{32}$ are methyl groups in the general formula (II').

(7) Silicon-containing monomer C: Silicon-containing polymerizable monomer wherein p=0, d=3, $R^6$ to $R^7$ and $R^{32}$ are methyl groups, and $R^8$ is $R^a$ (x=3, $R^{23}$ to $R^{27}$ are methyl groups) in the general formula (II'). (This monomer was sold by Nippon Unicar Company Limited under the trade name "F2-302-01".)

(8) Silicon-containing monomer D: Silicon-containing polymerizable monomer wherein p=10 d=3, $R^6$ to $R^7$ and $R^{32}$ are methyl groups, and $R^8$ is $R^a$ (x=3, $R^{23}$ to $R^{27}$ are methyl groups) in the general formula (II'), which is a 1:1 (molar ratio) mixture of those wherein c is 2 and 3. (This monomer was sold by Nippon Unicar Company Limited under the trade name "F2-302-04".)

(9) FM-7711 (trade name, product of CHISSO CORPORATION): Silicon-containing polymerizable monomer wherein q and s=0, f and g=3, r=10, and $R^9$ to $R^{12}$, $R^{33}$ and $R^{34}$ are methyl groups in the general formula (III').

(10) FM-7721 (trade name, product of CHISSO CORPORATION): Silicon-containing polymerizable monomer wherein q and s=0, f and g=3, r=65, and $R^9$ to $R^{12}$, $R^{33}$ and $R^{34}$ are methyl groups in the general formula (III').

(11) Silicon-containing monomer E: Silicon-containing polymerizable monomer wherein q and s=10, f and g=3, r=10, and $R^9$ to $R^{12}$, $R^{33}$ and $R^{34}$ are methyl groups in the general formula (III'), which is a 1:1 (molar ratio) mixture of those wherein e and h are 2 and 3. (This monomer was sold by Nippon Unicar Company Limited under the trade name "F2-354-04".)

(12) Silicon-containing monomer F: Silicon-containing polymerizable monomer wherein t and u=0, j and k=3, v and w=3, and $R^{13}$ to $R^{22}$, $R^{35}$ and $R^{36}$ are methyl groups in the general formula (IV'). (This monomer was sold by Nippon Unicar Company Limited under the trade name "F2-312-01".)

(13) Silicon-containing monomer G: Silicon-containing polymerizable monomer wherein t and u=10, j and k=3, v and w=3, and $R^{13}$ to $R^{22}$, $R^{35}$ and $R^{36}$ are methyl groups in the general formula (IV'), which is a 1:1 (molar ratio) mixture of those wherein i and l are 2 and 3. (This monomer was sold by Nippon Unicar Company Limited under the trade name "F2-312-04".)

(14) MMA: methyl methacrylate
(15) EA: ethyl acrylate
(16) 2-MTA: 2-methoxyethyl acrylate
(17) ST: styrene
(18) CHMA: cyclohexyl methacrylate
(19) CHA: cyclohexyl acrylate
(20) M-90G: methoxypolyethyleneglycol methacrylate (NK ester M-90G, product of Shin-Nakamura Chemical Co., Ltd.)
(21) AA: acrylic acid
(22) MAA: methacrylic acid
(23) Kayaester O: t-butylperoxy-2-ethylhexanoate (product of Kavaku Akuzo Corporation)
(24) AIBN: azobisisobutyronitrile
(25) AMBN: azobismethylbutyronitrile Examples 1 to 38, Comparative Examples 1 to 24

According to the formulation (part by mass) of Tables 3 to 6, antifouling coating compositions were prepared by mixing the hydrolyzable resin compositions or resin compositions S1 to S18 and T1 to T4 obtained in Production Examples S1 to S18 and T1 to T4, and other ingredients shown in Tables 3 to 6 using a high-speed disperser.

TABLE 3

| Unit: part by mass | | Example | | | | | | | | | |
|---|---|---|---|---|---|---|---|---|---|---|---|
| | | 1 | 2 | 3 | 4 | 5 | 6 | 7 | 8 | 9 | 10 |
| Hydrolyzable resin composition or resin composition | S1 | 84.0 | | | | | | | | | |
| | S2 | | 80.0 | | | | | | | | |
| | S3 | | | 88.5 | | | | | | | |
| | S4 | | | | 73.5 | | | | | | |
| | S5 | | | | | 70.0 | | | | | |
| | S6 | | | | | | 88.0 | | | | 76.5 |
| | S7 | | | | | | | 70.0 | | | |
| | S8 | | | | | | | | 85.0 | | |
| | S9 | | | | | | | | | 82.3 | |
| Cuprous oxide | | | | | | | | | | | |
| Antifouling agent 1 | | | | | | | | | | | |
| Antifouling agent 2 | | | | | | | | | | | |
| Antifouling agent 3 | | | | | | | | | | | |
| Antifouling agent 4 | | | | | | | | | | | |
| Antifouling agent 5 | | | | | | | | | | | |
| Titanium oxide | | | | | | | | | | | |
| Yellow iron oxide | | | | | | | | | | | |
| Azoic red pigment | | | | | | | | | | | |
| Phthalocyanine blue | | | | | | | | | | | |
| Thermoplastic resin 1 | | | | | 16.5 | 20.0 | | | | | |
| Thermoplastic resin 2 | | | 10.0 | | | | | | 20.0 | | |
| Thermoplastic resin 3 | | 6.0 | | | | | | | | | |
| Thermoplastic resin 4 | | | | | | | | 2.0 | | | |
| Plasticizer 1 | | | | | | | | | | 5.0 | |
| Plasticizer 2 | | | | | | | | | | | 13.5 |

TABLE 3-continued

|  | 1 | 2 | 3 | 4 | 5 | 6 | 7 | 8 | 9 | 10 |
|---|---|---|---|---|---|---|---|---|---|---|
| Plasticizer 3 |  |  |  |  |  |  |  | 7.7 |  |  |
| Plasticizer 4 |  |  | 1.5 |  |  |  |  |  |  |  |
| Barium sulfate |  |  |  |  |  |  |  |  |  |  |
| Antisettling agent |  |  |  |  |  |  |  |  |  |  |
| Xylene | 10.0 | 10.0 | 10.0 | 10.0 | 10.0 | 10.0 | 10.0 | 10.0 | 10.0 | 10.0 |
| Total | 100.0 | 100.0 | 100.0 | 100.0 | 100.0 | 100.0 | 100.0 | 100.0 | 100.0 | 100.0 |
| Total amount of thermoplastic resin and plasticizer per 100 parts by mass of resin (solid content) (part by mass) | 15.6 | 27.7 | 3.7 | 49.9 | 62.4 | 5.0 | 62.7 | 13.0 | 20.5 | 39.0 |
| Specific gravity (g/ml) | 1.01 | 1.00 | 1.00 | 1.00 | 1.04 | 1.00 | 1.00 | 1.01 | 1.02 | 1.03 |

| | | | Example | | | | | | | |
|---|---|---|---|---|---|---|---|---|---|---|
| Unit: part by mass | | | 11 | 12 | 13 | 14 | 15 | 16 | 17 | 18 | 19 |
| Hydrolyzable resin composition or resin composition | S1 | | | | | | | 68.0 | | | |
| | S2 | | 63.0 | | | | | | | | |
| | S3 | | | | | | 55.0 | | | | |
| | S4 | | | 65.0 | | | | | 61.0 | | |
| | S5 | | | | | 76.5 | | | | | |
| | S6 | | | | | | | | | 62.0 | |
| | S7 | | | | 78.1 | | | | | | 68.0 |
| | S8 | | | | | | | | | | |
| | S9 | | | | | | | | | | |
| Cuprous oxide | | | | | | | | 3.0 | | | |
| Antifouling agent 1 | | | | | | | | | 2.0 | | 3.0 |
| Antifouling agent 2 | | | | | | | | | | 2.0 | |
| Antifouling agent 3 | | | | | | | | | 2.0 | | |
| Antifouling agent 4 | | | | | | | 4.5 | | | 2.0 | |
| Antifouling agent 5 | | | | | | 2.0 | | | | | 2.0 |
| Titanium oxide | | | | | | | 2.0 | 2.0 | 2.0 | 2.0 | 2.0 |
| Yellow iron oxide | | | | | | | 1.0 | | | | |
| Azoic red pigment | | | | | | | 14.0 | 3.0 | | 4.0 | |
| Phthalocyanine blue | | | | | | | | | 4.0 | | 4.0 |
| Thermoplastic resin 1 | | | | | 5.3 | | 10.0 | | | | 4.0 |
| Thermoplastic resin 2 | | | 15.0 | | | | | 10.0 | | | |
| Thermoplastic resin 3 | | | 12.0 | 14.0 | | | | | 8.0 | | |
| Thermoplastic resin 4 | | | | | | 5.0 | | | | 11.0 | |
| Plasticizer 1 | | | | | | | 12.0 | | | | |
| Plasticizer 2 | | | | 4.6 | | | | | | | 5.0 |
| Plasticizer 3 | | | | | | 4.0 | | | 8.0 | | |
| Plasticizer 4 | | | | 11.0 | | | | | | | |
| Barium sulfate | | | | | | | | | | 3.0 | |
| Antisettling agent | | | | | | | | 2.0 | 2.0 | 2.0 | 2.0 | 2.0 |
| Xylene | | | 10.0 | 10.0 | 10.0 | 10.0 | 4.0 | 12.0 | 11.0 | 12.0 | 10.0 |
| Total | | | 100.0 | 100.0 | 100.0 | 100.0 | 100.0 | 100.0 | 100.0 | 100.0 | 100.0 |
| Total amount of thermoplastic resin and plasticizer per 100 parts by mass of resin (solid content) (part by mass) | | | 95.2 | 85.5 | 27.8 | 25.7 | 88.5 | 32.2 | 58.3 | 39.2 | 29.0 |
| Specific gravity (g/ml) | | | 1.02 | 1.05 | 1.03 | 1.05 | 1.10 | 1.04 | 1.07 | 1.09 | 1.07 |

TABLE 4

| | | | Example | | | | | | | | |
|---|---|---|---|---|---|---|---|---|---|---|---|
| Unit: part by mass | | | 20 | 21 | 22 | 23 | 24 | 25 | 26 | 27 | 28 | 29 |
| Hydrolyzable resin composition or resin composition | S10 | 85.0 | | | | | | | | | 84.0 |
| | S11 | | 70.0 | | | | | | | | |
| | S12 | | | 70.0 | | | | | | | |
| | S13 | | | | 88.0 | | | | | | |
| | S14 | | | | | 80.0 | | | | | |
| | S15 | | | | | | 82.3 | | | | |
| | S16 | | | | | | | 73.5 | | | |

TABLE 4-continued

|  |  |  |  |  |  |  |  |  |  |  |
|---|---|---|---|---|---|---|---|---|---|---|
| S17 |  |  |  |  |  |  |  | 76.5 |  |  |
| S18 |  |  |  |  |  |  |  |  | 88.5 |  |
| Cuprous oxide |  |  |  |  |  |  |  |  |  |  |
| Antifouling agent 1 |  |  |  |  |  |  |  |  |  |  |
| Antifouling agent 2 |  |  |  |  |  |  |  |  |  |  |
| Antifouling agent 3 |  |  |  |  |  |  |  |  |  |  |
| Antifouling agent 4 |  |  |  |  |  |  |  |  |  |  |
| Antifouling agent 5 |  |  |  |  |  |  |  |  |  |  |
| Titanium oxide |  |  |  |  |  |  |  |  |  |  |
| Yellow iron oxide |  |  |  |  |  |  |  |  |  |  |
| Azoic red pigment |  |  |  |  |  |  |  |  |  |  |
| Phthalocyanine blue |  |  |  |  |  |  |  |  |  |  |
| Thermoplastic resin 1 |  |  | 20.0 |  |  | 16.5 |  |  |  |  |
| Thermoplastic resin 2 |  | 20.0 |  |  | 10.0 |  |  |  |  |  |
| Thermoplastic resin 3 |  |  |  |  |  |  |  |  |  | 6.0 |
| Thermoplastic resin 4 |  |  |  | 2.0 |  |  |  |  |  |  |
| Plasticizer 1 | 5.0 |  |  |  |  |  |  |  |  |  |
| Plasticizer 2 |  |  |  |  |  |  |  | 13.5 |  |  |
| Plasticizer 3 |  |  |  |  |  | 7.7 |  |  |  |  |
| Plasticizer 4 |  |  |  |  |  |  |  |  | 1.5 |  |
| Barium sulfate |  |  |  |  |  |  |  |  |  |  |
| Antisettling agent |  |  |  |  |  |  |  |  |  |  |
| Xylene | 10.0 | 10.0 | 10.0 | 10.0 | 10.0 | 10.0 | 10.0 | 10.0 | 10.0 | 10.0 |
| Total | 100.0 | 100.0 | 100.0 | 100.0 | 100.0 | 100.0 | 100.0 | 100.0 | 100.0 | 100.0 |
| Total amount of thermoplastic resin and plasticizer per 100 parts by mass of resin (solid content) (part by mass) | 12.7 | 62.0 | 61.6 | 5.0 | 27.4 | 20.6 | 49.2 | 38.7 | 3.7 | 15.5 |
| Specific gravity (g/ml) | 1.01 | 1.00 | 1.04 | 1.00 | 1.00 | 1.02 | 1.00 | 1.03 | 1.00 | 1.01 |

|  |  | Example |  |  |  |  |  |  |  |  |
|---|---|---|---|---|---|---|---|---|---|---|
| Unit: part by mass |  | 30 | 31 | 32 | 33 | 34 | 35 | 36 | 37 | 38 |
| Hydrolyzable resin composition or resin composition | S10 |  |  |  |  |  |  | 61.0 |  |  |
|  | S11 | 63.0 |  |  |  |  | 68.0 |  |  |  |
|  | S12 |  |  |  |  |  |  |  | 62.0 |  |
|  | S13 |  |  |  |  | 55.0 |  |  |  |  |
|  | S14 |  |  | 78.1 |  |  |  |  |  | 68.0 |
|  | S15 |  | 65.0 |  |  |  |  |  |  |  |
|  | S16 |  |  |  | 76.5 |  |  |  |  |  |
|  | S17 |  |  |  |  |  |  |  |  |  |
|  | S18 |  |  |  |  |  |  |  |  |  |
| Cuprous oxide |  |  |  |  |  | 3.0 |  |  |  |  |
| Antifouling agent 1 |  |  |  |  |  |  |  | 2.0 |  | 3.0 |
| Antifouling agent 2 |  |  |  |  |  |  |  |  | 2.0 |  |
| Antifouling agent 3 |  |  |  |  |  |  |  | 2.0 |  |  |
| Antifouling agent 4 |  |  |  |  | 4.5 |  |  |  | 2.0 |  |
| Antifouling agent 5 |  |  |  | 2.0 |  |  |  |  |  | 2.0 |
| Titanium oxide |  |  |  |  |  | 2.0 | 2.0 | 2.0 | 2.0 | 2.0 |
| Yellow iron oxide |  |  |  |  |  | 1.0 |  |  |  |  |
| Azoic red pigment |  |  |  |  |  | 14.0 | 3.0 |  | 4.0 |  |
| Phthalocyanine blue |  |  |  |  |  |  | 4.0 |  |  | 4.0 |
| Thermoplastic resin 1 |  |  |  | 5.3 |  | 10.0 |  |  |  | 4.0 |
| Thermoplastic resin 2 |  | 15.0 |  |  |  |  | 10.0 |  |  |  |
| Thermoplastic resin 3 |  | 12.0 | 14.0 |  |  |  |  |  | 8.0 |  |
| Thermoplastic resin 4 |  |  |  |  | 5.0 |  |  |  |  |  |
| Plasticizer 1 |  |  |  |  |  | 12.0 |  |  | 11.0 |  |
| Plasticizer 2 |  |  |  | 4.6 |  |  |  |  |  | 5.0 |
| Plasticizer 3 |  |  |  |  | 4.0 |  |  | 8.0 |  |  |
| Plasticizer 4 |  |  | 11.0 |  |  |  |  |  |  |  |
| Barium sulfate |  |  |  |  |  |  |  |  | 3.0 |  |
| Antisettling agent |  |  |  |  |  | 2.0 | 2.0 | 2.0 | 2.0 | 2.0 |
| Xylene |  | 10.0 | 10.0 | 10.0 | 10.0 | 4.0 | 12.0 | 11.0 | 12.0 | 10.0 |
| Total |  | 100.0 | 100.0 | 100.0 | 100.0 | 100.0 | 100.0 | 100.0 | 100.0 | 100.0 |
| Total amount of thermoplastic resin and plasticizer per 100 parts by mass of resin (solid content) (part by mass) |  | 92.8 | 84.7 | 27.8 | 25.8 | 87.3 | 31.9 | 56.8 | 38.2 | 29.0 |
| Specific gravity (g/ml) |  | 1.02 | 1.05 | 1.03 | 1.05 | 1.10 | 1.04 | 1.08 | 1.09 | 1.07 |

TABLE 5

| Unit: part by mass | | Comparative example | | | | | | | | | | |
|---|---|---|---|---|---|---|---|---|---|---|---|---|
| | | 1 | 2 | 3 | 4 | 5 | 6 | 7 | 8 | 9 | 10 | 11 |
| Hydrolyzable resin composition or resin composition | S1 | 90.0 | 57.0 | | | | | | | | | |
| | S2 | | | 90.0 | | | | | | | | |
| | S3 | | | | 90.0 | | | | | | | |
| | S4 | | | | | 90.0 | | | | | | |
| | S5 | | | | | | 90.0 | | | | | |
| | S6 | | | | | | | 90.0 | | | | |
| | S7 | | | | | | | | 90.0 | | | |
| | S8 | | | | | | | | | 90.0 | | |
| | S9 | | | | | | | | | | 90.0 | |
| | T1 | | | | | | | | | | | 90.0 |
| Cuprous oxide | | | | | | | | | | | | |
| Antifouling agent 1 | | | | | | | | | | | | |
| Antifouling agent 2 | | | | | | | | | | | | |
| Antifouling agent 3 | | | | | | | | | | | | |
| Antifouling agent 4 | | | | | | | | | | | | |
| Titanium oxide | | | | | | | | | | | | |
| Yellow iron oxide | | | | | | | | | | | | |
| Azoic red pigment | | | | | | | | | | | | |
| Phthalocyanine blue | | | | | | | | | | | | |
| Thermoplastic resin 1 | | | 19.0 | | | | | | | | | |
| Thermoplastic resin 2 | | | | | | | | | | | | |
| Thermoplastic resin 3 | | | | | | | | | | | | |
| Thermoplastic resin 4 | | | | | | | | | | | | |
| Plasticizer 1 | | | 14.0 | | | | | | | | | |
| Plasticizer 2 | | | | | | | | | | | | |
| Plasticizer 3 | | | | | | | | | | | | |
| Plasticizer 4 | | | | | | | | | | | | |
| Barium sulfate | | | | | | | | | | | | |
| Antisettling agent | | | | | | | | | | | | |
| Xylene | | 10.0 | 10.0 | 10.0 | 10.0 | 10.0 | 10.0 | 10.0 | 10.0 | 10.0 | 10.0 | 10.0 |
| Total | | 100.0 | 100.0 | 100.0 | 100.0 | 100.0 | 100.0 | 100.0 | 100.0 | 100.0 | 100.0 | 100.0 |
| Total amount of thermoplastic resin and plasticizer per 100 parts by mass of resin (solid content) (part by mass) | | 0 | 126.7 | 0 | 0 | 0 | 0 | 0 | 0 | 0 | 0 | 0 |

TABLE 6

| Unit: part by mass | | Comparative example | | | | | | | | | | | | |
|---|---|---|---|---|---|---|---|---|---|---|---|---|---|
| | | 12 | 13 | 14 | 15 | 16 | 17 | 18 | 19 | 20 | 21 | 22 | 23 | 24 |
| Hydrolyzable resin composition or resin composition | S10 | 90.0 | | | | | | | | | | | | |
| | S11 | | 90.0 | 55.0 | | | | | | | | | | |
| | S12 | | | | 90.0 | | | | | | | | | |
| | S13 | | | | | 90.0 | | | | | | | | |
| | S14 | | | | | | 90.0 | | | | | | | |
| | S15 | | | | | | | 90.0 | | | | | | |
| | S16 | | | | | | | | 90.0 | | | | | |
| | S17 | | | | | | | | | 90.0 | | | | |
| | S18 | | | | | | | | | | 90.0 | | | |
| | T2 | | | | | | | | | | | 90.0 | | |
| | T3 | | | | | | | | | | | | 62.0 | |
| | T4 | | | | | | | | | | | | | 57.0 |
| Cuprous oxide | | | | | | | | | | | | | | 5.0 |
| Zinc oxide | | | | | | | | | | | | | 4.0 | |
| Antifouling agent 1 | | | | | | | | | | | | | 2.0 | |
| Antifouling agent 2 | | | | | | | | | | | | | | 2.0 |
| Antifouling agent 3 | | | | | | | | | | | | | 2.0 | |
| Antifouling agent 4 | | | | | | | | | | | | | | 2.0 |
| Titanium oxide | | | | | | | | | | | | | | 3.0 |
| Phthalocyanine blue | | | | | | | | | | | | | 2.0 | |
| Azoic red pigment | | | | | | | | | | | | | | 2.0 |
| Red iron oxide | | | | | | | | | | | | | 4.0 | 5.0 |
| Thermoplastic resin 1 | | | | | | | | | | | | | 5.0 | 5.0 |

TABLE 6-continued

| Unit: part by mass | Comparative example | | | | | | | | | | | | |
|---|---|---|---|---|---|---|---|---|---|---|---|---|---|
| | 12 | 13 | 14 | 15 | 16 | 17 | 18 | 19 | 20 | 21 | 22 | 23 | 24 |
| Thermoplastic resin 2 | | | 15.0 | | | | | | | | | | |
| Thermoplastic resin 3 | | | | | | | | | | | | 3.0 | 3.0 |
| Thermoplastic resin 4 | | | | | | | | | | | | | |
| Plasticizer 1 | | | | | | | | | | | | | |
| Plasticizer 2 | | | | | | | | | | | | | |
| Plasticizer 3 | | | 20.0 | | | | | | | | | | |
| Plasticizer 4 | | | | | | | | | | | | 3.0 | 3.0 |
| Antisettling agent | | | | | | | | | | | | 2.0 | 2.0 |
| Xylene | 10.0 | 10.0 | 10.0 | 10.0 | 10.0 | 10.0 | 10.0 | 10.0 | 10.0 | 10.0 | 10.0 | 11.0 | 11.0 |
| Total | 100.0 | 100.0 | 100.0 | 100.0 | 100.0 | 100.0 | 100.0 | 100.0 | 100.0 | 100.0 | 100.0 | 100.0 | 100.0 |
| Total amount of thermoplastic resin and plasticizer per 100 parts by mass of resin (solid content) (part by mass) | 0 | 0 | 138.0 | 0 | 0 | 0 | 0 | 0 | 0 | 0 | 0 | 23 | 25 |
| Specific gravity (g/ml) | | | | | | | | | | | | 1.19 | 1.23 |

The details of ingredients described in Tables 3 to 6 are as follows.

[1] cuprous oxide: product of NC Tech Co., Ltd. "NC-301"
[2] zinc oxide: "zinc oxide Type 2" product of SAKAI CHEMICAL INDUSTRY CO., LTD.
[3] antifouling agent 1: ZPT (zinc pyrithione) ("Zinc Omadine" product of Arch Chemicals)
[4] antifouling agent 2: CuPT (copper pyrithione) ("Copper Omadine" product of Arch Chemicals)
[5] antifouling agent 3: 1,1-dichloro-N-[(dimethylamino)sulfonyl]-1-fluoro-N-(4-methylphenyl)methanesulfenamide ("Preventol A5S" product of LANXESS)
[6] antifouling agent 4: 4,5-dichloro-2-n-octyl-4-isothiazoline-3-one (4,5-dichloro-2-n-octyl-3(2H)isothiazolone) ("Sea-Nine 211" product of Rohm and Haas Company)
[7] antifouling agent 5: 4-bromo-2-(4-chlorophenyl)-5-(trifluoromethyl)-1H-pyrrole-3-carbonitrile ("Econea" product of Janssen PMP)
[8] titanium oxide: "TI-PURE R-900" product of Du Pont Kabushiki Kaisha
[9] yellow iron oxide: "TAROX synthetic iron oxide LL-XLO" product of Titan Kogyo, Ltd.
[10] azoic red pigment: "FUJI FAST RED 2305A" product of Fuji Pigment CO., Ltd.
[11] phthalocyanine blue: "CYANINE BLUE G-105" product of Sanyo Color Works
[12] red iron oxide: "Toda Color KN-R" product of Toda Kogyo Corp.
[13] thermoplastic resin 1: chlorinated paraffin ("TOYOPARAX A50" product of TOSOH CORPORATION)
[14] thermoplastic resin 2: polyvinyl ether ("Lutonal A25" product of BASF Japan Ltd.)
[15] thermoplastic resin 3: rosin ("WW rosin" product of ARAKAWA CHEMICAL INDUSTRIES. LTD.)
[16] thermoplastic resin 4: vinyl chloride-isobutylvinyl ether copolymer ("Laroflex MP25" product of BASF Japan Ltd.)
[17] plasticizer 1: DOP (dioctyl phthalate) ("DOP" product of MITSUBISHI GAS CHEMICAL COMPANY INC)
[18] plasticizer 2: DIDP (diisodecyl phthalate) ("DIDP" product of CHISSO CORPORATION)
[19] plasticizer 3: TCP (tricresyl phosphate) ("TCP" product of DAIHACHI CHEMICAL INDUSTRY CO., LTD.)
[20] plasticizer 4: triaryl phosphate ("Reofos 65" product of AJINOMOTO CO INC.)
[21] barium sulfate: "Barite powder FBA" product of Naigai Talc Co., Ltd.
[22] anti-settling agent: "DISPARLON A600-20X" product of KUSUMOTO CHEMICALS, Ltd.

For antifouling films respectively formed from the antifouling coating compositions thus obtained, the long-term antifouling property, adherence with a base, crack resistance, polishing property and transparency were evaluated according to the following evaluation methods. The evaluation results are shown in Tables 7 to 10.

(1) Long-Term Antifouling Property

An obtained antifouling coating composition was applied on a blast plate previously coated with an antirust paint so that the dry film thickness was 300 μm, and dried by leaving it still in a room for two days and nights, to obtain a test plate having an antifouling film. The obtained test plate was subjected to an organism adhesion test using an experimental raft installed at a marine laboratory of NIPPON PAINT MARINE COATINGS CO., Ltd. in Tamano, Okayama Prefecture, Japan, and the antifouling property was evaluated. In the tables, the number of months indicates the term in which the raft is dipped. The numerical values in the tables represent the proportion (%) of organism adhesion area in the coating film area (visually determined) and 15% or less was determined as acceptable.

(2) Adherence with a Base (Grid Adhesion Test)

Using a test plate A that is obtained by applying an obtained antifouling coating composition on a blast plate previously coated with an antirust paint so that the dry film thickness was 150 μm, and drying by leaving it still in a room for two days and nights; and a test plate B that is obtained by applying the same antifouling coating composition as used in formation of the coating film on a surface of a coating film of a substrate obtained by dipping the test plate A in sterilized and filtered sea water for 3 months and leaving it still in a room for one night and day so that the dry film thickness was 150 μm, and drying by leaving it still in a room for two days and nights, a grid adhesion test (gap interval 2 mm, cell number 25) was conducted in conformance with JIS K 5600.5.6. The numerical values in the tables represent a score of a test result evaluated in accordance with the following criteria.

Score 10: Each scratch is thin and smooth in both sides, and has no peeling at an intersection of the scratch and in each square.

Score 8: Slight peeling is observed at an intersection of scratch, no peeling is observed in each square, and the area of a defected part is within 5% of the entire square area.

Score 6: Peeling is observed on both sides and at an intersection of scratch, and the area of a defected part is 5 to 15% of the entire square area.
Score 4: The width of peeling due to scratch is large, and the area of a defected part is 15 to 35% of the entire square area.
Score 2: The width of peeling due to scratch is larger than that of score 4, and the area of a defected part is 35 to 65% of the entire square area.
Score 0: The area of peeling is 65% or more of the entire square area.

(3) Crack Resistance (a) Crack Resistance Against Dipping in Sea Water (Evaluation of Condition of Coating Film after Dipping in Sea Water)

The state of a coating film of the test plate after dipping the raft for 6 months in the long-term antifouling property test was observed by visual check and rubbing, and evaluated. The state where no crack was observed was evaluated as A, and the state where a crack was observed was evaluated as B.

(b) Crack Resistance Against Repeated Drying and Wetting (Drying and Wetting Alternating Test)

An obtained antifouling coating composition was applied on a blast plate previously coated with an antirust paint so that the dry film thickness was 300 μm, and dried by leaving it still in a room for two days and nights, to obtain a test plate having an antifouling film. The obtained test plate was dipped in sea water of 40° C. for 1 week, and dried in a room for 1 week, and a drying and wetting alternating test including the above operations as one cycle was repeated up to the 20th cycle. When a crack occurred in the coating film during the test, the test ended at the point of time when the crack occurred, and the cycle number at that point was recorded in the table. The sample where no crack occurred even after 20 cycles was evaluated as A.

(4) Polishing Property (Coating Film Exhausted Amount (Polishing Speed) Test)

An obtained antifouling coating composition was applied on a blast plate previously coated with an antirust paint so that the dry film thickness was 300 μm, and dried by leaving it still in a room for two days and nights, to obtain a test plate having an antifouling film. The test plate was pasted on a lateral face of a cylinder having a diameter of 750 mm and a length of 1200 mm, and continuously rotated in sea water at a circumferential velocity of 15 knots for 24 months, and the coating film exhausted amount of the test plate was measured every 3 months (accumulated reduction amount [μm] of coating film thickness).

(5) Transparency of Coating Film

An obtained antifouling coating composition was applied on a glass plate of 130 mm wide×100 mm long×2.0 mm thick so that the dry film thickness was 150 μm by using an applicator, and dried by leaving it still in a room for one night and day, to obtain a test plate having an antifouling film. The test plate was put on newspaper, and transparency of the coating film was visually evaluated in accordance with the following criteria.

A: Completely transparent, and characters on the newspaper can be easily recognized.
B: Slightly transparent, and characters on the newspaper can be slightly recognized.
C: Completely masked, and characters on the newspaper cannot be recognized.

TABLE 7

| | | Example | | | | | | | | | |
|---|---|---|---|---|---|---|---|---|---|---|---|
| | | 1 | 2 | 3 | 4 | 5 | 6 | 7 | 8 | 9 | 10 |
| Long-term antifouling property [organism adhesion area (%)] | 3 months | 0 | 0 | 0 | 0 | 0 | 0 | 0 | 0 | 0 | 0 |
| | 6 months | 0 | 0 | 0 | 0 | 0 | 0 | 0 | 0 | 0 | 0 |
| | 12 months | 5 | 0 | 0 | 0 | 0 | 0 | 0 | 0 | 0 | 0 |
| | 18 months | 10 | 0 | 5 | 5 | 0 | 0 | 0 | 5 | 0 | 0 |
| | 24 months | 15 | 10 | 10 | 10 | 10 | 10 | 10 | 10 | 10 | 10 |
| Adherence with base (Grid adhesion test) | Test plate A | 10 | 10 | 10 | 10 | 10 | 10 | 10 | 10 | 10 | 10 |
| | Test plate B | 10 | 10 | 10 | 10 | 10 | 10 | 10 | 10 | 10 | 10 |
| Crack resistance | Dipping in sea water | A | A | A | A | A | A | A | A | A | A |
| | Repeated drying and wetting | A | A | A | A | A | A | A | A | A | A |
| Polishing property [coating film exhausted amount (μm)] | 3 months | 13 | 15 | 14 | 31 | 35 | 17 | 27 | 42 | 51 | 19 |
| | 6 months | 33 | 29 | 32 | 54 | 70 | 40 | 55 | 77 | 99 | 36 |
| | 9 months | 48 | 41 | 51 | 73 | 104 | 61 | 74 | 108 | 140 | 52 |
| | 12 months | 67 | 59 | 70 | 96 | 133 | 82 | 96 | 136 | 175 | 68 |
| | 15 months | 85 | 72 | 89 | 121 | 161 | 103 | 121 | 161 | 216 | 83 |
| | 18 months | 104 | 89 | 105 | 144 | 192 | 126 | 144 | 191 | 252 | 100 |
| | 21 months | 127 | 105 | 123 | 170 | 220 | 149 | 169 | 217 | 291 | 118 |
| | 24 months | 145 | 121 | 142 | 193 | 249 | 172 | 192 | 250 | — | 135 |
| Transparency of coating film | | A | — | A | A | — | A | A | A | A | — |

| | | Example | | | | | | | | |
|---|---|---|---|---|---|---|---|---|---|---|
| | | 11 | 12 | 13 | 14 | 15 | 16 | 17 | 18 | 19 |
| Long-term antifouling property [organism adhesion area (%)] | 3 months | 0 | 0 | 0 | 0 | 0 | 0 | 0 | 0 | 0 |
| | 6 months | 0 | 0 | 0 | 0 | 0 | 0 | 0 | 0 | 0 |
| | 12 months | 0 | 0 | 0 | 0 | 0 | 0 | 0 | 0 | 0 |
| | 18 months | 0 | 5 | 0 | 0 | 5 | 0 | 0 | 0 | 0 |
| | 24 months | 10 | 10 | 0 | 0 | 10 | 0 | 0 | 0 | 0 |

TABLE 7-continued

|  |  |  |  |  |  |  |  |  |  |  |
|---|---|---|---|---|---|---|---|---|---|---|
| Adherence with base (Grid adhesion test) | Test plate A | 10 | 10 | 10 | 10 | 10 | 10 | 10 | 10 | 10 |
|  | Test plate B | 10 | 10 | 10 | 10 | 10 | 10 | 10 | 10 | 10 |
| Crack resistance | Dipping in sea water | A | A | A | A | A | A | A | A | A |
|  | Repeated drying and wetting | A | A | A | A | A | A | A | A | A |
| Polishing property [coating film exhausted amount (μm)] | 3 months | 19 | 44 | 17 | 50 | 11 | 22 | 42 | 11 | 17 |
|  | 6 months | 38 | 77 | 33 | 99 | 22 | 46 | 73 | 26 | 34 |
|  | 9 months | 56 | 109 | 45 | 150 | 33 | 68 | 104 | 40 | 46 |
|  | 12 months | 77 | 143 | 58 | 191 | 42 | 86 | 136 | 53 | 59 |
|  | 15 months | 96 | 179 | 73 | 242 | 54 | 110 | 170 | 67 | 74 |
|  | 18 months | 116 | 211 | 87 | 293 | 67 | 134 | 200 | 82 | 88 |
|  | 21 months | 139 | 248 | 100 | — | 80 | 159 | 236 | 97 | 102 |
|  | 24 months | 160 | 281 | 115 | — | 92 | 179 | 267 | 112 | 117 |
| Transparency of coating film |  | A | — | A | A | — | — | — | — | — |

TABLE 8

|  |  | Example | | | | | | | | | |
|---|---|---|---|---|---|---|---|---|---|---|---|
|  |  | 20 | 21 | 22 | 23 | 24 | 25 | 26 | 27 | 28 | 29 |
| Long-term antifouling property [organism adhesion area (%)] | 3 months | 0 | 0 | 0 | 0 | 0 | 0 | 0 | 0 | 0 | 0 |
|  | 6 months | 0 | 0 | 0 | 0 | 0 | 0 | 0 | 0 | 0 | 0 |
|  | 12 months | 0 | 0 | 0 | 0 | 0 | 0 | 0 | 0 | 0 | 0 |
|  | 18 months | 10 | 0 | 0 | 0 | 0 | 0 | 0 | 0 | 0 | 10 |
|  | 24 months | 15 | 5 | 0 | 0 | 0 | 0 | 0 | 0 | 0 | 15 |
| Adherence with base (Grid adhesion test) | Test plate A | 10 | 10 | 10 | 10 | 10 | 10 | 10 | 10 | 10 | 10 |
|  | Test plate B | 10 | 10 | 10 | 10 | 10 | 10 | 10 | 10 | 10 | 10 |
| Crack resistance | Dipping in sea water | A | A | A | A | A | A | A | A | A | A |
|  | Repeated drying and wetting | A | A | A | A | A | A | A | A | A | A |
| Polishing property [coating film exhausted amount (μm)] | 3 months | 12 | 13 | 43 | 23 | 18 | 21 | 30 | 29 | 30 | 19 |
|  | 6 months | 27 | 35 | 85 | 45 | 32 | 39 | 55 | 56 | 59 | 39 |
|  | 9 months | 43 | 54 | 127 | 67 | 45 | 57 | 79 | 83 | 86 | 57 |
|  | 12 months | 58 | 71 | 171 | 90 | 61 | 80 | 106 | 112 | 114 | 75 |
|  | 15 months | 71 | 89 | 212 | 114 | 79 | 98 | 132 | 139 | 142 | 94 |
|  | 18 months | 85 | 108 | 251 | 141 | 98 | 122 | 154 | 162 | 172 | 114 |
|  | 21 months | 101 | 126 | 292 | 165 | 117 | 143 | 179 | 185 | 200 | 136 |
|  | 24 months | 116 | 145 | — | 188 | 133 | 164 | 204 | 213 | 228 | 153 |
| Transparency of coating film |  | A | — | — | — | A | A | A | — | A | — |

|  |  | Example | | | | | | | | | |
|---|---|---|---|---|---|---|---|---|---|---|---|
|  |  | 30 | 31 | 32 | 33 | 34 | 35 | 36 | 37 | 38 |  |
| Long-term antifouling property [organism adhesion area (%)] | 3 months | 0 | 0 | 0 | 0 | 0 | 0 | 0 | 0 | 0 |  |
|  | 6 months | 0 | 0 | 0 | 0 | 0 | 0 | 0 | 0 | 0 |  |
|  | 12 months | 0 | 0 | 0 | 0 | 0 | 0 | 0 | 0 | 0 |  |
|  | 18 months | 0 | 0 | 0 | 0 | 0 | 0 | 0 | 0 | 0 |  |
|  | 24 months | 5 | 0 | 0 | 0 | 0 | 0 | 0 | 0 | 0 |  |
| Adherence with base (Grid adhesion test) | Test plate A | 10 | 10 | 10 | 10 | 10 | 10 | 10 | 10 | 10 |  |
|  | Test plate B | 10 | 10 | 10 | 10 | 10 | 10 | 10 | 10 | 10 |  |
| Crack resistance | Dipping in sea water | A | A | A | A | A | A | A | A | A |  |
|  | Repeated drying and wetting | A | A | A | A | A | A | A | A | A |  |
| Polishing property [coating film exhausted amount (μm)] | 3 months | 18 | 21 | 14 | 37 | 16 | 16 | 15 | 40 | 14 |  |
|  | 6 months | 42 | 38 | 24 | 69 | 30 | 37 | 30 | 79 | 24 |  |
|  | 9 months | 61 | 57 | 34 | 102 | 43 | 53 | 46 | 118 | 34 |  |
|  | 12 months | 79 | 78 | 46 | 137 | 58 | 69 | 61 | 158 | 47 |  |
|  | 15 months | 99 | 97 | 59 | 170 | 73 | 85 | 75 | 199 | 60 |  |
|  | 18 months | 119 | 117 | 73 | 198 | 89 | 103 | 92 | 240 | 74 |  |
|  | 21 months | 138 | 139 | 86 | 230 | 103 | 121 | 107 | 281 | 88 |  |
|  | 24 months | 158 | 158 | 100 | 262 | 118 | 138 | 122 | — | 102 |  |
| Transparency of coating film |  | — | — | A | A | — | — | — | — | — |  |

TABLE 9

| | | Comparative example | | | | | | | | | | |
|---|---|---|---|---|---|---|---|---|---|---|---|---|
| | | 1 | 2 | 3 | 4 | 5 | 6 | 7 | 8 | 9 | 10 | 11 |
| Long-term antifouling property [organism adhesion area (%)] | 3 months | 0 | 0 | 0 | 0 | 0 | 0 | 0 | 0 | 0 | 0 | 100 |
| | 6 months | 0 | 0 | 0 | 0 | 0 | 0 | 0 | 0 | 0 | 0 | 100 |
| | 12 months | 5 | 10 | 0 | 0 | 0 | 0 | 0 | 0 | 0 | 0 | 100 |
| | 18 months | 10 | 30 | 5 | 5 | 5 | 0 | 0 | 0 | 5 | 0 | 100 |
| | 24 months | 15 | 40 | 10 | 10 | 10 | 5 | 10 | 10 | 10 | 10 | 100 |
| Adherence with base (Grid adhesion test) | Test plate A | 10 | 6 | 10 | 10 | 10 | 10 | 10 | 10 | 10 | 10 | 0 |
| | Test plate B | 8 | 6 | 6 | 6 | 6 | 10 | 10 | 8 | 8 | 10 | 0 |
| Crack resistance | Dipping in sea water | B | A | B | B | B | B | B | B | B | B | B |
| | Repeated drying and wetting | 10 | A | 11 | 10 | 14 | 12 | 10 | 11 | 10 | 12 | 8 |
| Polishing property [coating film exhausted amount (μm)] | 3 months | 17 | 9 | 12 | 19 | 45 | 55 | 25 | 21 | 47 | 60 | 0 |
| | 6 months | 35 | 18 | 24 | 37 | 82 | 110 | 48 | 41 | 92 | 117 | 0 |
| | 9 months | 51 | 26 | 35 | 56 | 110 | 167 | 69 | 55 | 122 | 166 | 0 |
| | 12 months | 66 | 34 | 48 | 75 | 145 | 213 | 90 | 71 | 150 | 209 | 0 |
| | 15 months | 84 | 43 | 60 | 94 | 181 | 269 | 111 | 91 | 177 | 261 | 0 |
| | 18 months | 102 | 52 | 74 | 110 | 213 | — | 134 | 108 | 205 | — | 0 |
| | 21 months | 121 | 61 | 88 | 128 | 250 | — | 157 | 121 | 240 | — | 0 |
| | 24 months | 137 | 70 | 101 | 147 | 284 | — | 180 | 142 | 283 | — | 0 |
| Transparency of coating film | | — | — | — | — | — | — | — | — | — | — | A |

TABLE 10

| | | Comparative example | | | | | | | | | | | | |
|---|---|---|---|---|---|---|---|---|---|---|---|---|---|---|
| | | 12 | 13 | 14 | 15 | 16 | 17 | 18 | 19 | 20 | 21 | 22 | 23 | 24 |
| Long-term antifouling property [organism adhesion area (%)] | 3 months | 0 | 0 | 0 | 0 | 0 | 0 | 0 | 0 | 0 | 0 | 60 | 10 | 0 |
| | 6 months | 0 | 0 | 0 | 0 | 0 | 0 | 0 | 0 | 0 | 0 | 100 | 40 | 30 |
| | 12 months | 0 | 0 | 10 | 0 | 0 | 0 | 0 | 0 | 0 | 0 | 100 | 80 | 70 |
| | 18 months | 10 | 0 | 20 | 0 | 0 | 0 | 0 | 0 | 0 | 0 | 100 | 100 | 100 |
| | 24 months | 15 | 5 | 40 | 0 | 0 | 0 | 0 | 0 | 0 | 0 | 100 | 100 | 100 |
| Adherence with base (Grid adhesion test) | Test plate A | 10 | 10 | 6 | 10 | 10 | 10 | 10 | 10 | 10 | 10 | 0 | 10 | 10 |
| | Test plate B | 10 | 10 | 4 | 10 | 10 | 10 | 10 | 10 | 10 | 10 | 0 | 10 | 10 |
| Crack resistance | Dipping in sea water | B | B | A | B | B | B | B | B | B | B | B | A | A |
| | Repeated drying and wetting | 10 | 10 | A | 14 | 10 | 11 | 10 | 10 | 12 | 12 | 10 | A | A |
| Polishing property [coating film exhausted amount (μm)] | 3 months | 17 | 12 | 13 | 66 | 27 | 15 | 25 | 41 | 39 | 31 | 0 | 19 | 82 |
| | 6 months | 33 | 28 | 31 | 131 | 49 | 27 | 47 | 77 | 75 | 60 | 0 | 35 | 99 |
| | 9 months | 50 | 41 | 45 | 196 | 72 | 38 | 70 | 113 | 112 | 89 | 0 | 51 | 111 |
| | 12 months | 67 | 53 | 58 | 264 | 97 | 51 | 96 | 152 | 150 | 117 | 0 | 71 | 124 |
| | 15 months | 83 | 66 | 73 | — | 121 | 65 | 118 | 189 | 187 | 145 | 0 | 89 | 127 |
| | 18 months | 100 | 79 | 87 | — | 148 | 81 | 145 | 220 | 217 | 175 | 0 | 107 | 129 |
| | 21 months | 117 | 92 | 101 | — | 172 | 96 | 170 | 256 | 251 | 207 | 0 | 127 | 134 |
| | 24 months | 134 | 105 | 116 | — | 197 | 110 | 195 | 291 | 287 | 231 | 0 | 144 | 137 |
| Transparency of coating film | | — | — | — | — | — | — | — | — | — | — | A | C | C |

As shown in Tables 7 to 10, antifouling films obtained from the antifouling coating compositions of examples are excellent in long-term antifouling property, adherence with a base, and crack resistance. On the other hand, antifouling films obtained from the antifouling, coating compositions of comparative examples were insufficient in long-term antifouling property, or lacked crack resistance or adherence with a base even though an excellent long-term antifouling property was exhibited. Also, exclusion of a thermoplastic resin or a plasticizer can lead to an excess coating film exhausted amount (Comparative Examples 6 and 15).

The invention claimed is:

1. An antifouling coating composition, comprising:
   a hydrolyzable resin having at least one kind of silicon-containing group selected from the group consisting of the groups represented by the following general formulas (I), (II), (III) and (IV) and a metal-atom-containing group containing a divalent metal atom M; and
   a thermoplastic resin and/or a plasticizer,
   wherein said thermoplastic resin is at least one kind selected from the group consisting of chlorinated paraffin, polyvinyl ether, rosin, and a vinyl chloride-isobutyl vinyl ether copolymer,
   wherein said plasticizer is at least one kind selected from the group consisting of a phthalate ester plasticizer and a phosphate ester plasticizer,
   wherein the total content of said thermoplastic resin and/or plasticizer is 3 to 100 parts by mass per 100 parts by mass of said hydrolyzable resin:

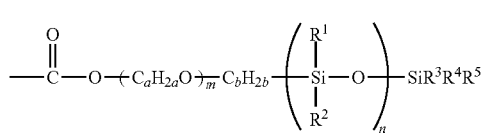
(I)

wherein a and b each independently represents an integer of 2 to 5, m represents an integer of 0 to 50, and n represents an integer of 3 to 80; and $R^1$ to $R^5$ each independently represents an alkyl group, an alkoxy group, a phenyl group, a substituted phenyl group, a phenoxy group or a substituted phenoxy group;

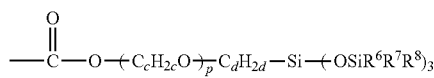
(II)

wherein c and d each independently represents an integer of 2 to 5, and p represents an integer of 0 to 50; $R^6$, $R^7$ and $R^8$ each independently represents an alkyl group, $R^a$ or $R^b$;

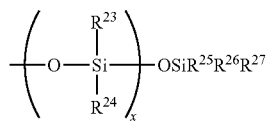

wherein $R^a$ represents
wherein x represents an integer of 0 to 20; and $R^{23}$ to $R^{27}$ are the same or different and each represent an alkyl group, and
$R^b$ represents

wherein y represents an integer of 1 to 20; and $R^{28}$ and $R^{29}$ are the same or different and each represent an alkyl group;

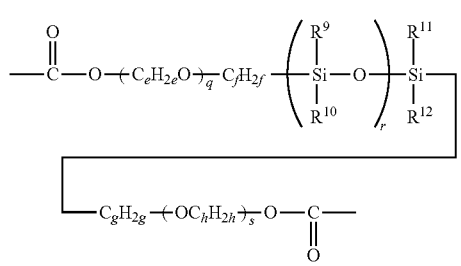
(III)

wherein e, f, g and h each independently represents an integer of 2 to 5, q and s each independently represents an integer of 0 to 50, and r represents an integer of 3 to 80; and $R^9$ to $R^{12}$ each independently represents an alkyl group, an alkoxy group, a phenyl group, a substituted phenyl group, a phenoxy group or a substituted phenoxy group;

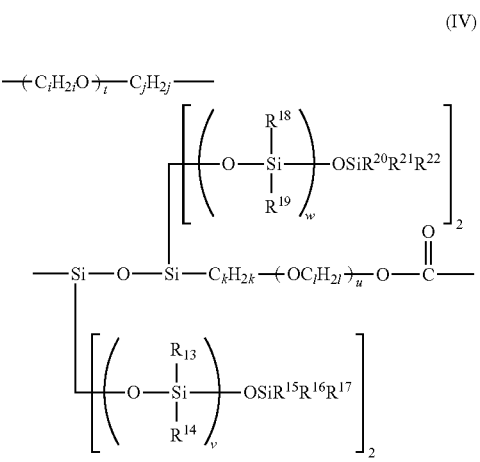
(IV)

wherein i, j, k and l each independently represents an integer of 2 to 5, t and u each independently represents an integer of 0 to 50, and v and w each independently represents an integer of 0 to 20; and $R^{13}$ to $R^{22}$ are the same or different and each represents an alkyl group;
wherein said metal-atom-containing group is at least one kind of group selected from the group consisting of the groups represented by the following general formulas (V) and (VI):

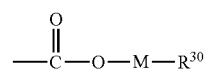
(V)

wherein M represents a divalent metal atom, and $R^{30}$ represents an organic acid residue; and

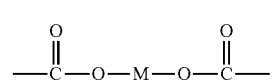
(VI)

wherein M represents a divalent metal atom;
wherein said hydrolyzable resin is a resin comprising:
a constituent unit derived from at least one kind of silicon-containing polymerizable monomer (a) selected from the group consisting of: a monomer (a1) represented by the following general formula (I'), a monomer (a2) represented by the following general formula (II'), a monomer (a3) represented by the following general formula (III') and a monomer (a4) represented by the following general formula (IV'); and
a constituent unit derived from a metal-atom-containing polymerizable monomer (b) containing a divalent metal atom M:

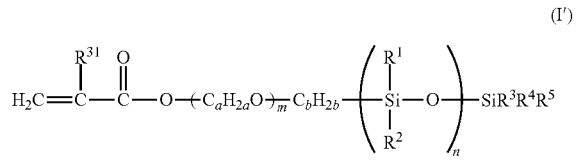
(I')

wherein $R^{31}$ represents a hydrogen atom or a methyl group, and a, b, m, n and $R^1$ to $R^5$ represent the same meaning as previously mentioned;

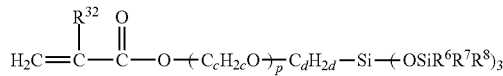
(II')

wherein $R^{32}$ represents a hydrogen atom or a methyl group, and c, d, p and $R^6$ to $R^8$ represent the same meaning as previously mentioned;

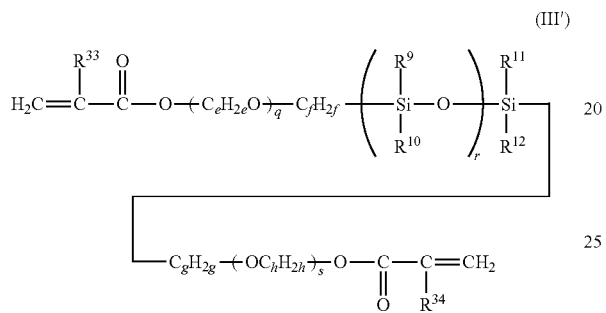
(III')

wherein $R^{33}$ and $R^{34}$ represent a hydrogen atom or a methyl group, and e, f, g, h, q, r, s and $R^9$ to $R^{12}$ represent the same meaning as previously mentioned; and

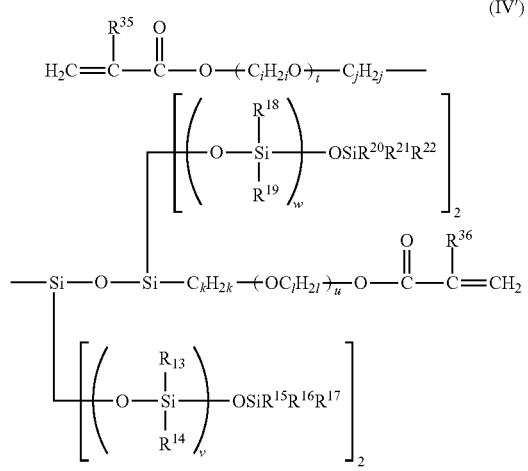
(IV')

wherein $R^{35}$ and $R^{36}$ represent a hydrogen atom or a methyl group, and i, j, k, l, t, u, v, w and $R^{13}$ to $R^{22}$ represent the same meaning as previously mentioned;

wherein said metal-atom-containing polymerizable monomer (b) includes at least one kind selected from the group consisting of a monomer (b1) represented by the following general formula (V') and a monomer (b2) represented by (VI'):

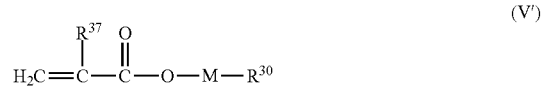
(V')

wherein $R^{37}$ represents a hydrogen atom or a methyl group, and M and $R^{30}$ represent the same meaning as previously mentioned; and

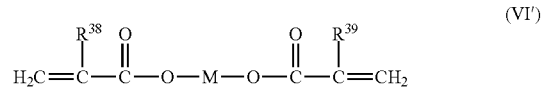
(VI')

wherein $R^{38}$ and $R^{39}$ represent a hydrogen atom or a methyl group, and M represents the same meaning as previously mentioned;

wherein the ratio between the content of said constituent unit derived from the silicon-containing polymerizable monomer (a) and the content of said constituent unit derived from the metal-atom-containing polymerizable monomer (b) containing a divalent metal atom M is in the range of 45/55 to 85/15 by mass ratio.

2. An antifouling film formed from the antifouling coating composition according to claim 1.

3. A ship having the antifouling film according to claim 2.

4. A composite film having a primer film formed from an antirust paint, and an antifouling film formed from the antifouling coating composition according to claim 1, overlaid on said primer film.

5. An in-water structure having the antifouling film according to claim 4.

6. The composite film according to claim 4, further having an intermediate film formed on an entire or part of a surface of said primer film between said primer film and said antifouling film.

7. The composite film according to claim 6, wherein said intermediate film is a coating film formed from an antifouling coating composition containing an antifouling agent.

* * * * *